United States Patent
Agiwal et al.

(10) Patent No.: US 11,832,213 B2
(45) Date of Patent: Nov. 28, 2023

(54) METHOD AND APPARATUS FOR TRANSMITTING AND RECEIVING SYSTEM INFORMATION

(71) Applicant: Samsung Electronics Co., Ltd., Suwon-si (KR)

(72) Inventors: Anil Agiwal, Suwon-si (KR); Mangesh Abhimanyu Ingale, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/557,745

(22) Filed: Dec. 21, 2021

(65) Prior Publication Data

US 2022/0116907 A1    Apr. 14, 2022

Related U.S. Application Data

(63) Continuation of application No. 16/366,331, filed on Mar. 27, 2019, now Pat. No. 11,206,633.

(30) Foreign Application Priority Data

Mar. 28, 2018    (IN) .............................. 201811011728

(51) Int. Cl.
    *H04W 68/00*    (2009.01)
    *H04W 76/28*    (2018.01)
    *H04L 5/00*     (2006.01)

(52) U.S. Cl.
    CPC .......... *H04W 68/00* (2013.01); *H04W 76/28* (2018.02); *H04L 5/0007* (2013.01)

(58) Field of Classification Search
    None
    See application file for complete search history.

(56) References Cited

U.S. PATENT DOCUMENTS

| | | | |
|---|---|---|---|
| 2009/0310503 | A1 | 12/2009 | Tenny et al. |
| 2010/0272037 | A1 | 10/2010 | Lee et al. |

(Continued)

FOREIGN PATENT DOCUMENTS

| | | | |
|---|---|---|---|
| EP | 3 253 130 A1 | 12/2017 | |
| KR | 10-2016-0054625 A | 5/2016 | |
| WO | 2015042780 A1 | 4/2015 | |

OTHER PUBLICATIONS

3GPP; TSGRAN; NR; Physical layer procedures for control {Release 15), 3GPP TS 38.213 V15.0.0, Jan. 3, 2018 See section 13., Valbonne, France.

(Continued)

*Primary Examiner* — Saba Tsegaye
(74) *Attorney, Agent, or Firm* — Jefferson IP Law, LLP

(57) ABSTRACT

A communication method and system for converging a fifth generation (5G) communication system for supporting higher data rates beyond a fourth generation (4G) system with a technology for Internet of things (IoT) are provided. The communication method and system may be applied to intelligent services based on the 5G communication technology and the IoT-related technology, such as smart home, smart building, smart city, smart car, connected car, health care, digital education, smart retail, security and safety services. A method of a terminal receiving a paging message is provided. In addition, a method of a terminal acquiring system information is provided.

12 Claims, 16 Drawing Sheets

(56) References Cited

U.S. PATENT DOCUMENTS

| | | | |
|---|---|---|---|
| 2013/0114483 A1 | 5/2013 | Suzuki | |
| 2015/0264665 A1* | 9/2015 | Vos | H04L 5/00 |
| | | | 370/329 |
| 2016/0057738 A1 | 2/2016 | Lee et al. | |
| 2016/0295637 A1 | 10/2016 | Bergquist et al. | |
| 2017/0251500 A1* | 8/2017 | Agiwal | H04W 72/21 |
| 2017/0303235 A1 | 10/2017 | Deogun et al. | |
| 2017/0367069 A1 | 12/2017 | Agiwal et al. | |
| 2018/0014249 A1 | 1/2018 | Nagasaka et al. | |
| 2018/0255529 A1* | 9/2018 | Yu | H04W 68/02 |
| 2018/0332585 A1* | 11/2018 | Faurie | H04W 72/12 |
| 2019/0053029 A1 | 2/2019 | Agiwal et al. | |
| 2020/0045671 A1* | 2/2020 | Hapsari | H04W 48/20 |
| 2020/0059862 A1 | 2/2020 | Wong et al. | |
| 2020/0280957 A1 | 9/2020 | Gao et al. | |
| 2020/0305094 A1* | 9/2020 | Ouchi | H04W 72/23 |

OTHER PUBLICATIONS

International Search Report dated Jul. 4, 2019, issued in International Patent Application No. PCT/KR2019/003650.
Indian Office Action dated Aug. 30, 2022, issued in Indian Patent Application No. 201811011728.
Chinese Office Action dated Sep. 6, 2023, issued in Chinese Application No. 201980023210.3.

* cited by examiner

METHOD AND APPARATUS FOR TRANSMITTING AND RECEIVING SYSTEM INFORMATION

CROSS-REFERENCE TO RELATED APPLICATION(S)

This application is a continuation application of prior application Ser. No. 16/366,331, filed on Mar. 27, 2019, which has issued as U.S. Pat. No. 11,206,633 on Dec. 21, 2021, which was based on and claims priority under 35 U.S.C. § 119 (a) of an Indian patent application number 201811011728, filed on Mar. 28, 2018, in the Indian Patent Office, the disclosure of which is incorporated by reference herein in its entirety.

BACKGROUND

1. Field

The disclosure relates to a system and a method of master information block (MIB) acquisition in wireless communication system.

2. Description of the Related Art

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'beyond 4G network' or a 'post long term evolution (LTE) System'. The 5G wireless communication system is considered to be implemented not only in lower frequency bands but also in higher frequency (mm Wave) bands, e.g., 10 GHz to 100 GHz bands, so as to accomplish higher data rates. To mitigate propagation loss of the radio waves and increase the transmission (TX) distance, the beamforming, massive multiple-input multiple-output (MIMO), full dimensional MIMO (FD-MIMO), array antenna, an analog beam forming, and large scale antenna techniques are being considered in the design of the 5G wireless communication system. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM), frequency QAM (FQAM) and sliding window superposition coding (SWSC) as an advanced coding modulation (ACM), filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the big data processing technology through connection with a cloud server, has emerged. As technology elements, such as "sensing technology," "wired/wireless communication and network infrastructure," "service interface technology," and "Security technology" have been demanded for IoT implementation, a sensor network, a machine-to-machine (M2M) communication, machine type communication (MTC), and so forth have been recently researched. Such an internet of things (IoT) environment may provide intelligent Internet technology services that create a new value to human life by collecting and analyzing data generated among connected things. IoT may be applied to a variety of fields including smart home, smart building, smart city, smart car or connected cars, smart grid, health care, smart appliances, and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

In the recent years several broadband wireless technologies have been developed to meet the growing number of broadband subscribers and to provide more and better applications and services. The second generation (2G) wireless communication system has been developed to provide voice services while ensuring the mobility of users. Third generation (3G) wireless communication system supports not only the voice service but also data service. The 4G wireless communication system has been developed to provide high-speed data service. However, the 4G wireless communication system currently suffers from lack of resources to meet the growing demand for high speed data services. Therefore, the 5G wireless communication system is being developed to meet the growing demand of various services with diverse requirements, e.g., high speed data services, support ultra-reliability and low latency applications.

In addition, the 5G wireless communication system is expected to address different use cases having quite different requirements in terms of data rate, latency, reliability, mobility etc. However, it is expected that the design of the air-interface of the 5G wireless communication system would be flexible enough to serve the user equipments (UEs) having quite different capabilities depending on the use case and market segment the UE cater service to the end customer. Example use cases the 5G wireless communication system is expected to address is enhanced mobile broadband (eMBB), massive machine type communication (m-MTC), ultra-reliable low latency communication (URLL) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data TX, very long battery life, low mobility address so on and so forth address the market segment representing the IoT/IoE envisioning connectivity of billions of devices. The URLL requirements like very low latency, very high reliability and variable mobility so on and so forth address the market segment representing the industrial automation application, vehicle-to-vehicle/vehicle-to-infrastructure communication foreseen as one of the enabler for autonomous cars.

In the 4G wireless communication system, evolved node B (eNB) or base station (BS) in a cell broadcast system information (SI). SI is structured into a master information block (MIB) and a set of system information blocks (SIBs).

MIB consists of a system frame number (SFN), downlink system bandwidth (BW), and physical hybrid automatic repeat request (ARQ) feedback indicator channel (PHICH) configuration. MIB is transmitted every 40 ms. It is repeated every 10 ms wherein the first transmission (TX) occurs in subframe #0 when SFN mod 4 equals zero. MIB is transmitted on physical broadcast channel (PBCH). SIB Type 1 (i.e., SIB 1) carries cell identity, tracking area code, cell barring information, value tag (common for all scheduling units), and scheduling information of other SIBs. SIB 1 is transmitted every 80 ms in subframe #5 when SFN mod 8 equals zero. SIB 1 is repeated in subframe #5 when SFN mod 2 equals zero. SIB 1 is transmitted on physical downlink shared channel (PDSCH). Other SIBs (i.e., SIB 2 to SIB 19) are transmitted in an SI message wherein scheduling information of these SIBs are indicated in SIB 1.

UE acquires the SI at cell selection, cell reselection, after handover completion, after entering evolved universal mobile telecommunications system (UMTS) terrestrial radio access (E-UTRA) from another radio access technology (RAT), upon re-entering service area, upon receiving a notification (paging), and upon exceeding the maximum validity duration (3 hour). In radio resource control (RRC) idle state and inactive state, UE needs to acquire MIB, SIB 1, SIB 2 to SIB 5, SIB 6 to SIB 8 (depending on RAT supported), SIB 17 (if LTE-wireless local area network (WLAN) interworking (IWK) is supported), and SIB 18 to SIB 19 (if D2D is supported). In an RRC connected state, UE needs to acquire MIB, SIB 1, SIB 2, SIB 8 (depending on RAT supported), SIB 17 (if LTE-WLAN IWK is supported), and SIB 18 to SIB 19 (if D2D is supported).

In the 4G wireless communication system, SI change is notified through a paging message (in RRC_IDLE or RRC_CONNECTED) with cause systemInfoModification to let the UE know that some SI is changing in the next modification period. UE is not provided with the details of which SI is updated. There are certain drawbacks in this approach of change notification. If an SIB is updated in a cell, all the UE's camped to that cell are notified that there is change in SI. Based on this notification, UE does not know which SIB is updated. So, UE has to discard all the acquired SIBs and has to reacquire all of them irrespective of whether UE is interested in the SIB which is updated or not. This leads to unnecessary power consumption at UE.

In the 5G wireless communication system (also referred as next generation radio or new radio (NR)), SI (i.e., one or more SIBs or SI messages) is transmitted over PDSCH. The carrier BW is also partitioned into multiple bandwidth parts (BWPs) in frequency domain. The PDSCH carrying SI is transmitted over the initial downlink (DL) BWP. The configuration of initial DL BWP is signaled in MIB. The MIB is transmitted on a PBCH. The PBCH is transmitted in a synchronization signal (SS) block (SSB) together with synchronization signals (i.e., primary SS (PSS)/secondary SS (SSS)). The SSB spans 4 orthogonal frequency division multiplex (OFDM) symbols in time domain and 240 subcarriers in frequency domain. The subcarrier spacing (SCS) used for SSB is fixed per frequency band. There is a configurable offset between starting resource block (RB) of SSB and starting RB of initial DL BWP. The SCS used for SSB carrying MIB and SCS for other DL channels (physical downlink control channel (PDCCH)/PDSCH used for system information) transmitted in initial DL BWP can also be different.

In the legacy system, whenever UE receives a paging message including SI update notification, UE always reacquire the MIB irrespective of whether MIB is updated or not.

In next generation radio, MIB contains several parameters such as systemFrameNumber (6 bits most significant bit (MSB)), subCarrierSpacingCommon, ssb-SubcarrierOffset, dmrs-TypeA-Position, pdcch-ConfigSIB1, cellBarred and intraFreqReselection information. Once the UE has acquired systemFrameNumber in a cell, UE does not need to reacquire MIB again for systemFrameNumber while staying on the camped cell in IDLE/INACTIVE state or while being served in CONNECTED state. However, if UE undergoes cell re-selection in IDLE/INACTIVE state or handover in CONNECTED state needs to reacquire MIB of re-selected/target cell. The parameters ssb-SubcarrierOffset, dmrs-TypeA-Position, pdcch-ConfigSIB1, cellBarred, and intraFreqReselection can be updated by network in a cell but these updates happen rarely. MIB contents are transmitted on PBCH along with layer 1 (L1) contents comprising systemFrameNumber (4 bits least significant bit (LSB)), half frame bit and 3 bits for SS/PBCH block index (3 MSBs for above 6 GHz operation), otherwise, 1 bit for subcarrier (SC) offset and 2 bits reserved (for below 6 GHz operation). The total PBCH size including MIB contents, L1 contents and 24 bits cyclic redundancy check (CRC) is 56 bits. Also these parameters (i.e. MIB contents and L1 contents) are not updated whenever one or more SIBs are updated by network. So reacquiring MIB every time one or more SIBs are updated is unnecessary.

In next generation radio, acquisition of MIB (i.e. PBCH decoding) may require UE to switch to BW of SSB from BW of initial DL BWP (where UE receives remaining minimum system information (RMSI)/on demand SI (OSI)/Paging), as there is a configurable offset between starting RB of SSB and starting RB of initial DL BWP. Acquisition of MIB may also require SCS switching as SCS used for MIB and SCS for other DL channels (PDCCH/PDSCH used for RMSI/OSI/Paging) can be different. The RRC CONNECTED UE, UE can be configured to monitor and receive DL transmissions from a next generation node B (gNB) in one or more DL BWPs. DL BWPs in which UE receive in DL is referred as active DL BWP. The acquisition of MIB every time any SI is updated leads to data interruption for RRC CONNECTED UE as MIB may not be present in UE's active DL BWP. The acquisition of MIB every time any SI is updated leads to data interruption, unnecessary power consumption and delay to acquire to the updated system information.

Therefore, an enhanced method of updating MIB and SI is needed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a communication method and system for converging a fifth generation (5G) communication system for supporting higher data rates beyond a fourth generation (4G) system.

Additional aspects will be set forth in part in the description which follows and, in part, will be apparent from the description, or may be learned by practice of the presented embodiments.

In the legacy system, whenever user equipment (UE) receives a paging message including system information (SI) update notification, UE always reacquires the master information block (MIB) irrespective of whether MIB is updated or not. In next generation radio or new radio (NR), the parameters (i.e., MIB contents and layer 1 (L1) contents) are not updated whenever one or more SIBs are updated by network. So reacquiring MIB every time one or more SIBs are updated is unnecessary and leads to data interruption, unnecessary power consumption and delay to acquire to the updated system information. In next generation radio, acquisition of MIB (i.e., PBCH decoding) may require UE to switch to bandwidth (BW) of synchronization signal (SS) block (SSB) from BW of initial downlink (DL) bandwidth part (BWP) (where UE receives remaining minimum system information (RMSI)/on demand SI (OSI)/paging), as there is a configurable offset between starting resource block (RB) of SSB and starting RB of initial DL BWP. Acquisition of MIB may also require subcarrier spacing (SCS) switching as SCS used for MIB and SCS for other DL channels (physical downlink control channel (PDCCH)/physical downlink shared channel (PDSCH) used for RMSI/OSI/paging) can be different. The radio resource control (RRC) CONNECTED UE, UE can be configured to monitor and receive DL transmissions from next generation node B (gNB) in one or more DL BWPs. DL BWPs in which UE receive in DL is referred as active DL BWP. The acquisition of MIB every time any system information is updated leads to data interruption for RRC CONNECTED UE as MIB may not be present in UE's active DL BWP. The acquisition of MIB every time any system information is updated leads to data interruption, unnecessary power consumption and delay to acquire to the updated system information. The disclosure overcomes these problems.

In accordance with an aspect of the disclosure, a method of a terminal receiving a paging message is provided. The method includes determining a paging frame based on an offset, a discontinuous reception (DRX) cycle of the terminal, a number of paging frames in the DRX cycle, and an identifier of the terminal, wherein information on the offset is obtained from system information, determining a paging occasion based on a number of paging occasions for the paging frame, the paging occasion including a set of physical downlink control channel (PDCCH) monitoring occasions, and monitoring the paging occasion to receive the paging message.

In accordance with another aspect of the disclosure, a terminal receiving a paging message is provided. The terminal includes a transceiver configured to receive signals from a base station (BS) and transmit signals to the base station, and a controller coupled with the transceiver and configured to determine a paging frame based on an offset, a discontinuous reception (DRX) cycle of the terminal, a number of paging frames in the DRX cycle, and a identifier of the terminal, wherein information on the offset is obtained from system information, determine a paging occasion based on a number of paging occasions for the paging frame, the paging occasion including a set of PDCCH monitoring occasions, and monitor the paging occasion to receive the paging message.

In accordance with another aspect of the disclosure, a method of a terminal acquiring system information is provided. The method includes receiving an indication about change of system information, and acquire a system information block 1 (SIB 1) based on a state of the terminal.

In accordance with another aspect of the disclosure, a terminal acquiring system information is provided. The terminal includes a transceiver configured to receive signals from a base station (BS) and transmit signals to the base station, and a controller coupled with the transceiver and configured to control the transceiver to receive an indication about change of system information, and acquire a system information block 1 (SIB 1) based on a state of the terminal.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
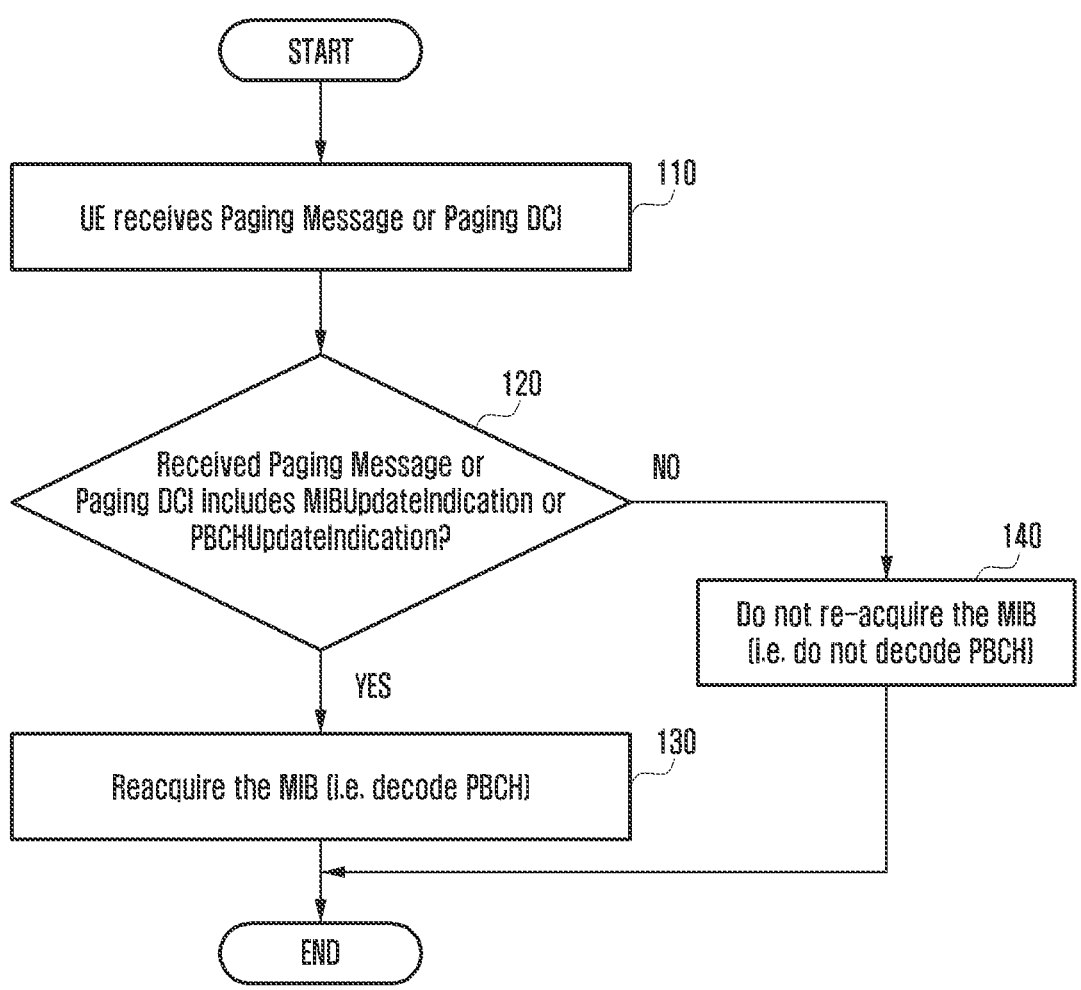
FIG. 1 shows the user equipment (UE) operations based on Embodiment 1 according to Method 1 of the disclosure.

Throughout the drawings, like reference numerals will be understood to refer to like parts, components, and structures.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit," "module" or the like may refer to a software component or hardware component, such as, for example, a field-programmable gate array (FPGA) or an application-specific integrated circuit (ASIC) capable of carrying out a function or an operation. However, a "unit," or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station (BS)" is an entity communicating with a user equipment (UE) and may be referred to as BS, base transceiver station (BTS), node B (NB), evolved NB (eNB), access point (AP), fifth generation (5G) NB (5GNB), or next generation NB (gNB).

The "UE" is an entity communicating with a BS and may be referred to as UE, device, mobile station (MS), mobile equipment (ME), or terminal.

In the fifth generation (5G) wireless communication system (also referred as next generation radio or NR), system information (SI) (i.e., one or more system information blocks (SIBs) or SI messages) is transmitted over a physical downlink shared channel (PDSCH). The carrier bandwidth (BW) is also partitioned into multiple bandwidth parts (BWPs) in frequency domain. The PDSCH carrying SI is transmitted over the initial downlink (DL) BWP. The configuration of initial DL BWP is signaled in a master information block (MIB). The MIB contents and layer 1 (L1) contents together are transmitted as one transport block along with a 24 bit cyclic redundancy check (CRC) on a physical broadcast channel (PBCH. The PBCH is transmitted in a synchronization signal (SS) block (SSB) together with synchronization signals (i.e., primary SS (PSS)/secondary SS (SSS)). The SSB spans 4 orthogonal frequency division multiplex (OFDM) symbols in time domain and 240 subcarriers in frequency domain. The subcarrier spacing (SCS) used for SSB is fixed per frequency band. There is a configurable offset between starting resource block (RB) of SSB and starting RB of initial DL BWP. The SCS used for SSB carrying MIB and SCS for other DL channels (physical downlink control channel (PDCCH)/PDSCH used for system information) transmitted in initial DL BWP can also be different.

In the legacy system, whenever a UE receives a paging message including an SI update notification, the UE always reacquire the MIB irrespective of whether the MIB is updated or not. In next generation radio, MIB contains several parameters, such as systemFrameNumber (6 bits most significant bit (MSB)), subCarrierSpacingCommon, ssb-SubcarrierOffset, dmrs-TypeA-Position, pdcch-ConfigSIB1, cellBarred and intraFreqReselection information. Once the UE has acquired systemFrameNumber in a cell, the UE does not need to reacquire MIB again for systemFrameNumber while staying on the camped cell in IDLE/INACTIVE state or while being served in CONNECTED state. However, if the UE undergoes cell re-selection in IDLE/INACTIVE state or handover in CONNECTED state, the UE needs to reacquire MIB of re-selected/target cell. The parameters ssb-SubcarrierOffset, dmrs-TypeA-Position, pdcch-ConfigSIB1, cellBarred, and intraFreqReselection can be updated by network in a cell but these updates happen rarely. MIB contents are transmitted on PBCH along with L1 contents comprising systemFrameNumber (4 bits least significant bit (LSB)), half frame bit and 3 bits for SS/PBCH block index (3 MSBs for above 6 GHz operation), otherwise, 1 bit for subcarrier (SC) offset and 2 bits reserved (for below 6 GHz operation). The total PBCH size including MIB contents, L1 contents and 24 bits CRC is 56 bits. Also these parameters (i.e., MIB contents and L1 contents) are not updated whenever one or more SIBs are updated by network. Therefore, reacquiring MIB every time one or more SIBs are updated is unnecessary.

In next generation radio, acquisition of MIB may require UE to switch to BW of SSB from BW of initial DL BWP (where UE receives remaining minimum system information (RMSI)/on demand SI (OSI)/Paging), as there is a configurable offset between starting RB of SSB and starting RB of initial DL BWP. Acquisition of MIB may also require SCS switching as SCS used for MIB and SCS for other DL channels (PDCCH/PDSCH used for RMSI/OSI/Paging) can be different. The RRC CONNECTED UE, UE can be configured to monitor and receive DL transmissions from gNB in one or more DL BWPs. DL BWPs in which UE receive in DL is referred as active DL BWP. The acquisition of MIB every time any SI is updated leads to data interruption for RRC CONNECTED UE as MIB may not be present in UE's active DL BWP. The acquisition of MIB every time any SI is updated leads to data interruption, unnecessary power consumption and delay to acquire to the updated system information.

Method 1:

In order to overcome the abovementioned issues, in one method of the disclosure, upon receiving SI update notification from gNB, UE reacquires MIB (i.e., decode PBCH) only if one or more MIB parameters (other than systemFrameNumber) are updated. The SI update notification can be received in paging message. Alternately SI update notification can be received in paging downlink control information (DCI) wherein the PDCCH is addressed to paging radio network temporary identifier (P-RNTI).

Embodiment 1: MIB Update Indication or PBCH Update Indication in Paging Message or Paging DCI In order to enable the UE to determine whether parameters of MIB contents or L1 contents are updated or whether UE should reacquire MIB, gNB may transmit a notification (e.g., 'MIBUpdateIndication,' 'MIBUpdateNotification,' MIBReacquireNotification,' 'MIBReacquireIndication,' or 'PBCHUpdateIndication'). This notification can be transmitted in a paging message. Alternately this notification can be transmitted in DCI wherein the PDCCH is addressed to P-RNTI.

In an embodiment, this notification can be a one bit notification indicating TRUE (1) or FALSE (0) wherein upon receiving this notification, the UE reacquires MIB, i.e., decodes PBCH if notification is set to TRUE and UE does not reacquire MIB, i.e., no need to decode PBCH if notification is set to FALSE. The network (i.e., gNB) sets this notification to TRUE if it wants to update the parameter(s) of the MIB contents and/or L1 contents of PBCH other than systemFrameNumber. Otherwise it sets the notification to FALSE.

In another embodiment, this notification can be optionally included in paging message or paging DCI wherein the notification is set to TRUE if it is included. Upon receiving this notification, the UE reacquire MIB, i.e., decodes PBCH if notification set to TRUE is included in paging message or paging DCI. The network (i.e., gNB) includes this notification in a paging message or paging DCI if it wants to update the parameter (s) of the MIB contents or L1 contents of PBCH other than systemFrameNumber.

FIG. 1 shows UE operations based on Embodiment 1 according to Method 1 of the disclosure.

Referring to FIG. 1, the UE receives a paging message or a paging DCI, at operation 110. The UE determines whether the received paging message or the paging DCI includes an MIB update indication or a PBCH update indication, at operation 120. If the received paging message or the paging DCI includes the MIB update indication or the PBCH update indication, the UE may reacquire the MIB, i.e., decode PBCH, at operation 130. If the received paging message or the paging DCI does not include the MIB update indication or the PBCH update indication, the UE does not reacquire the MIB, i.e., do not decode PBCH, at operation 140.

Figure 2:
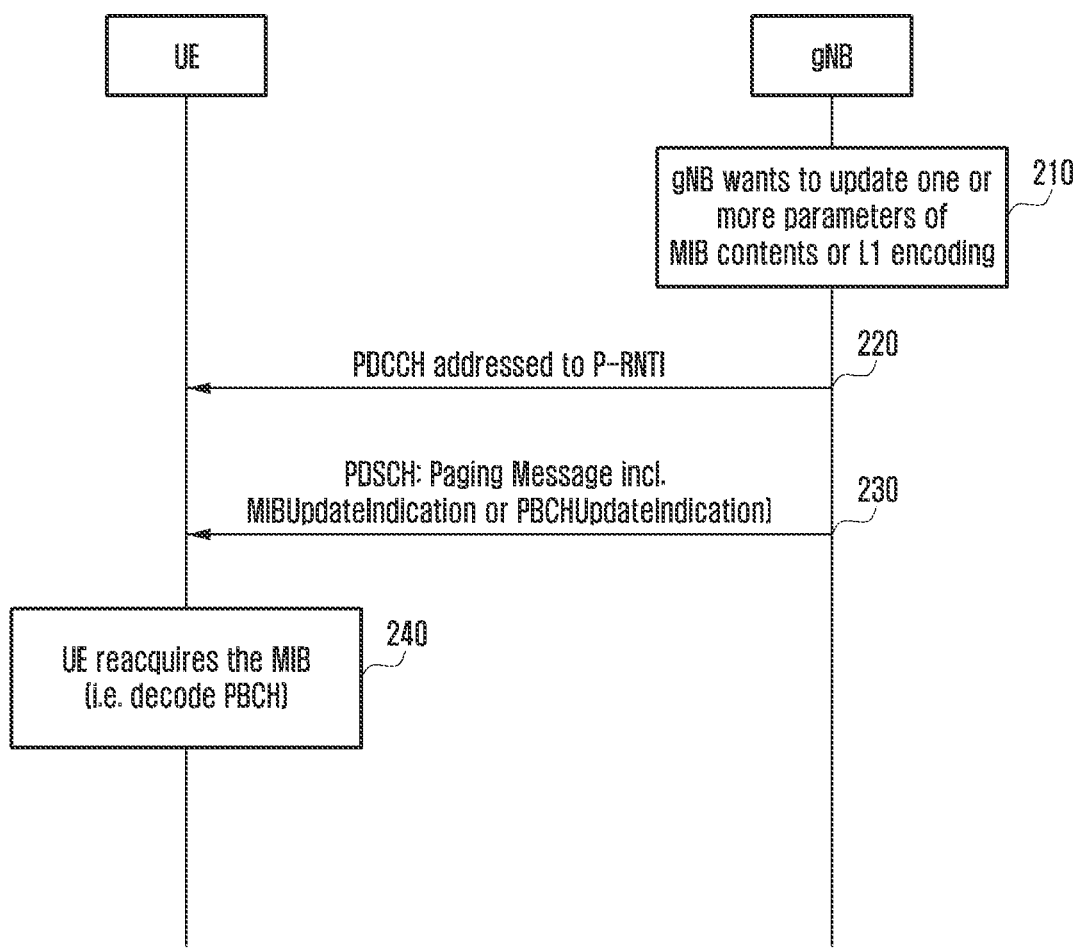
FIG. 2 shows signaling between a UE and a next generation node B (gNB) wherein a notification is included in a paging message based on Embodiment 1 according to Method 1 of the disclosure.

FIG. 2 shows signaling between a UE and a gNB wherein the notification is included in paging message based on Embodiment 1 according to Method 1 of the disclosure.

Referring to FIG. 2, the gNB determines whether to update one or more parameters of MIB contents or L1 contents, at operation 210. If the gNB wants to update one or more parameters of MIB contents or L1 contents, the gNB transmits control information through PDCCH addressed to P-RNTI, at operation 220, and the gNB transmits a paging message including an MIB update indication or a PBCH update indication though PDSCH, at operation 230. The UE reacquires the MIB, i.e., decodes PBCH, at operation 240.

Figure 3:
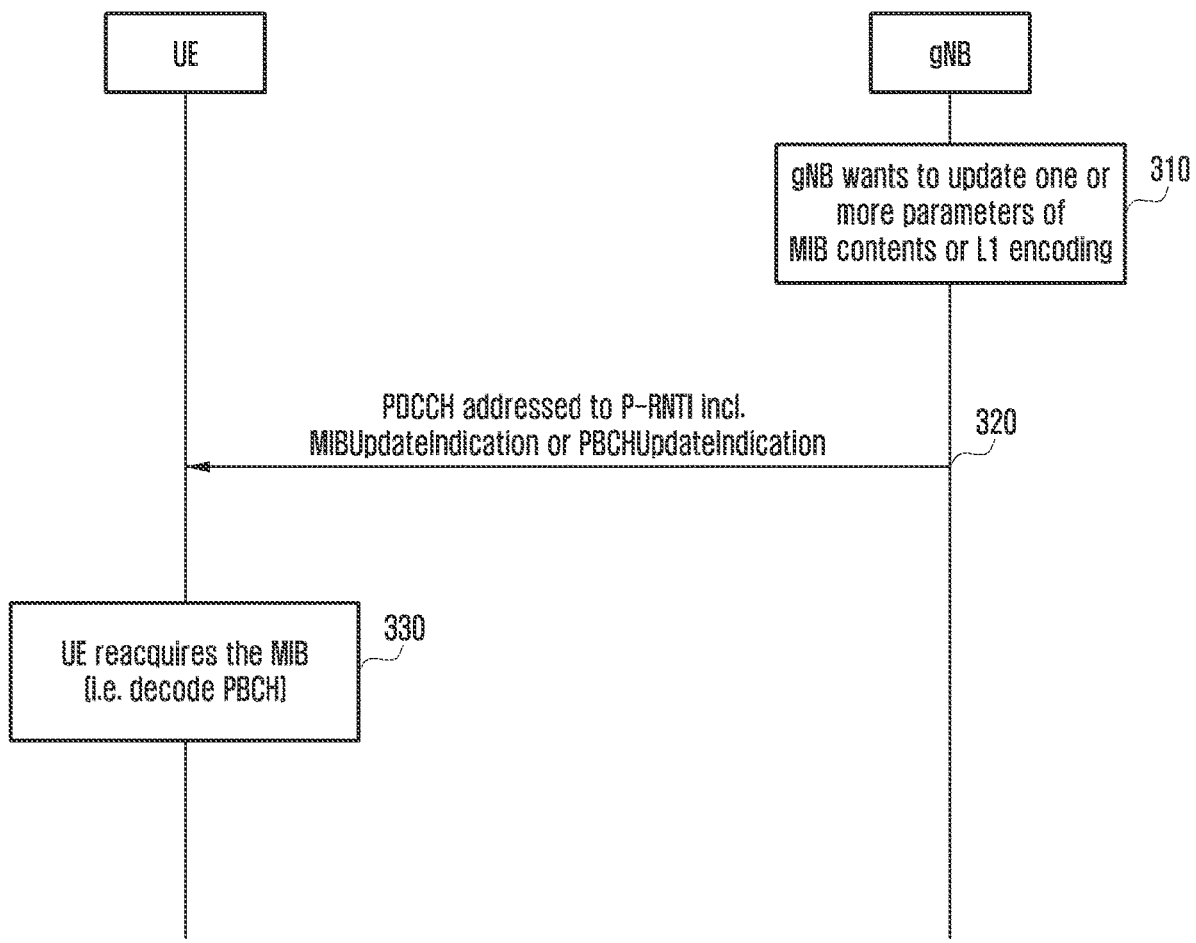
FIG. 3 shows signaling between a UE and a gNB wherein a notification is included in paging downlink control information (DCI) based on Embodiment 1 according to Method 1 of the disclosure.

FIG. 3 shows signaling between a UE and a gNB wherein the notification is included in paging DCI based on Embodiment 1 according to Method 1 of the disclosure.

Referring to FIG. 3, the gNB determines whether to update one or more parameters of MIB contents or L1 contents, at operation 310. If the gNB wants to update one or more parameters of MIB contents or L1 contents, the gNB transmits control information through PDCCH addressed to P-RNTI, at operation 320. The control information includes an MIB update indication or a PBCH update indication. The UE reacquires the MIB, i.e., decodes PBCH, at operation 330.

It is to be noted that P-RNTI used in FIG. 2 and FIG. 3 can be the same or different.

It is to be noted that, in a system in which MIB update notification is included only in paging DCI, a UE checks for this notification in paging DCI and not in paging message.

Embodiment 2: MIB Update Indication or PBCH Update Indication Using P-RNTI

In an embodiment, the MIB update notification or PBCH update notification can be indicated in paging message or paging DCI by using a P-RNTI reserved for indicating MIB update/PBCH update. In this case, MIB update notification bit is not needed in paging message or paging DCI. The PDCCH will be addressed (i.e., CRC is masked) to this reserved P-RNTI if the network (i.e., gNB) wants the UE to reacquire the MIB (i.e., decode PBCH). Otherwise the network will use the other P-RNTI.

Figure 4:
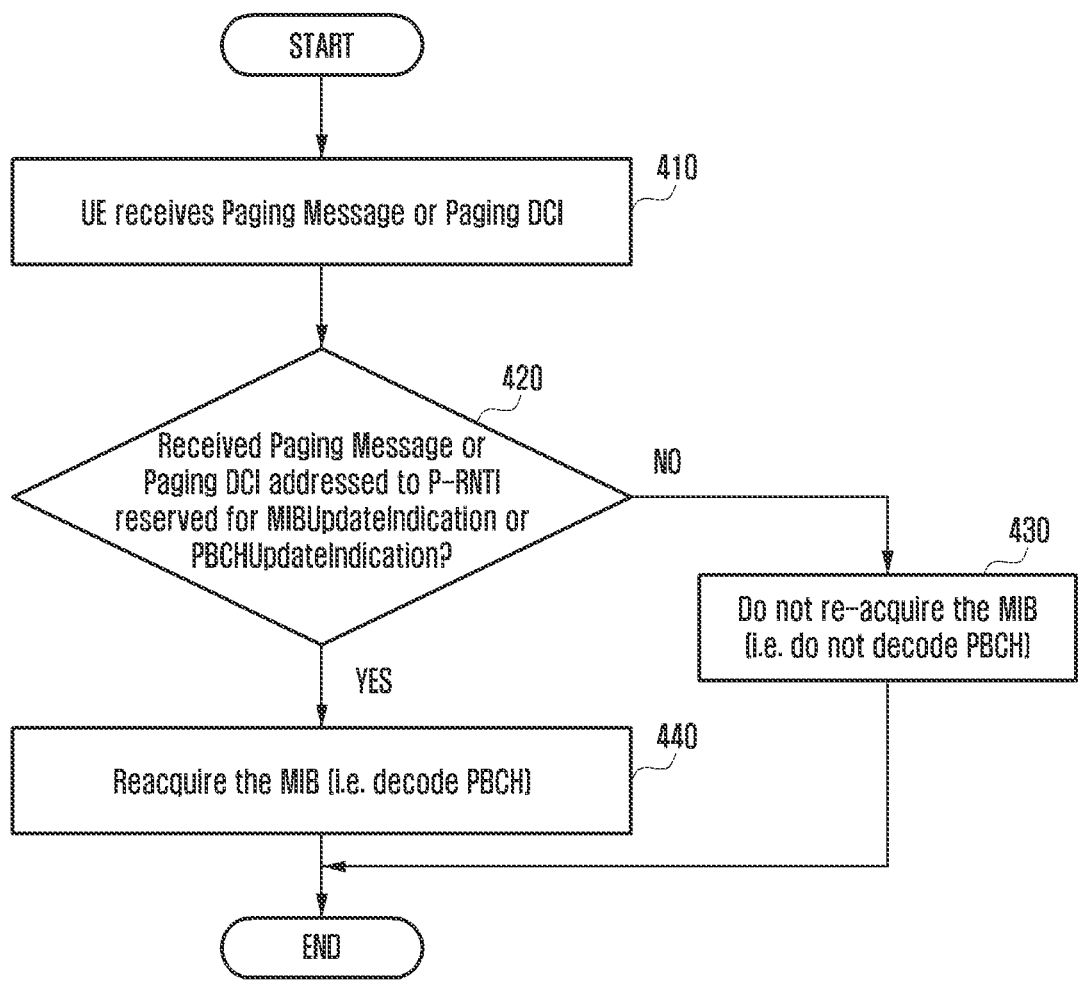
FIG. 4 shows UE operations based on Embodiment 2 according to Method 1 of the disclosure.

FIG. 4 shows UE operations based on Embodiment 2 according to Method 1 of the disclosure.

FIG. 4 illustrates an SI response reception according to Embodiment 1A of the disclosure.

Referring to FIG. 4, the UE receives a paging message or a paging DCI, at operation 410. The UE determines whether the received paging message or the paging DCI is addressed to P-RNTI reserved for an MIB update indication or a PBCH update indication, at operation 420. If the received paging message or the paging DCI is addressed to P-RNTI reserved for the MIB update indication or the PBCH update indication, the UE may reacquire the MIB, i.e., decode PBCH, at operation 430. If the received paging message or the paging DCI is not addressed to P-RNTI reserved for the MIB update indication or the PBCH update indication, the UE does not reacquire the MIB, i.e., does not decode PBCH, at operation 440.

Embodiment 3: MIB Update Indication/PBCH Update Indication+Update Indication for SIB 1

Figure 5:
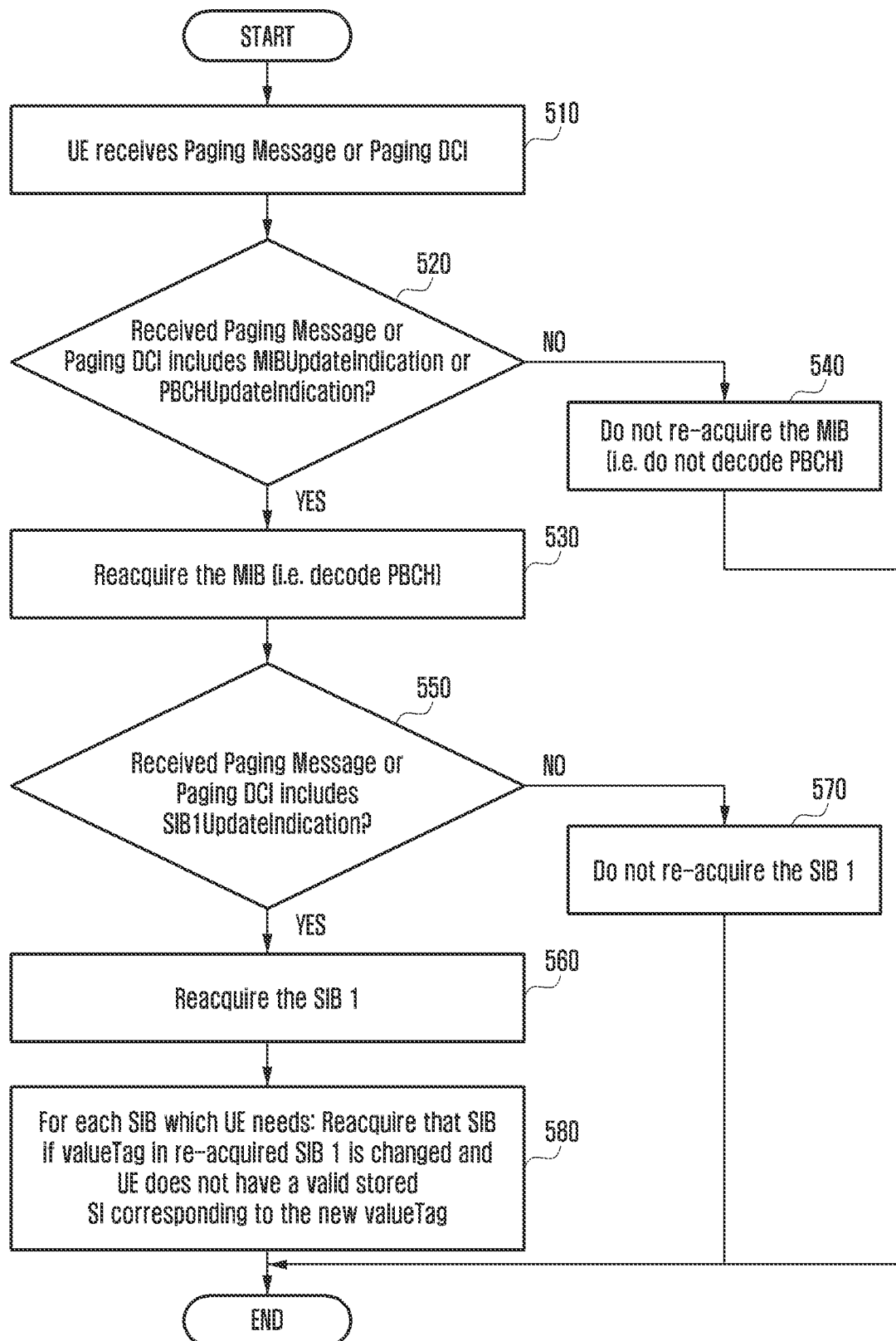
FIG. 5 shows UE operations for a master information block (MIB) and system information (SI) update based on Embodiment 3 according to Method 1 of the disclosure.

FIG. 5 shows UE operations for an MIB and SI update based on Embodiment 3 according to Method 1 of the disclosure.

Referring to FIG. 5, upon receiving the paging message or paging DCI, at operation 510, UE checks whether MIB update notification (or PBCH update indication) is included in the received paging message or paging DCI or not, at operation 520. If yes, UE reacquires the MIB (i.e., decodes PBCH), at operation 530. Otherwise, UE does not reacquire the MIB (i.e., does not decode PBCH), at operation 540.

In an embodiment, the MIB update notification or PBCH update notification can be indicated in paging message or paging DCI by using a P-RNTI reserved for indicating MIB update. In this case MIB update notification bit is not needed in paging message or paging DCI. The PDCCH will be addressed (i.e., CRC is masked) to this reserved P-RNTI if the network wants the UE to reacquire the MIB (i.e. decode PBCH). Otherwise network will use the other P-RNTI. In this embodiment, UE will check whether the received paging message or paging DCI is addressed to P-RNTI reserved for MIB update indication or not. If yes, UE reacquires the MIB. Otherwise UE does not reacquire the MIB.

UE also checks whether SIB1 or SI update notification is included in received paging message or paging DCI or not, at operation 550. If yes, UE reacquires the SIB1, at operation 560. Otherwise UE does not reacquire SIB1, at operation 570. Upon reacquiring SIB1, for each SIB (other than SIBs related to emergency notifications) which UE needs to maintain depending on its state and/or service supported by it, UE reacquires that SIB if valueTag of that SIB in reacquired SIB1 is changed and UE does not have a valid stored SI corresponding to the new valueTag for that SIB, at operation 580. For SIBs related to emergency notifications (i.e., earthquake and tsunami warning system (ETWS)/commercial mobile alert system (CMAS)), paging message or paging DCI can include separate notification(s) indicating UE to reacquire these earthquake and tsunami warning system (ETWS)/commercial mobile alert system (CMAS) SIB(s).

The SIB1Updationindication is included in paging message or paging DCI when network (NW) wants to update for, e.g., the contents of SIB1, i.e., camping parameters, scheduling information, (excluding the toggling of on-demand indicator) or if camping parameters, scheduling information, etc. does not change but individual valuetag of any SIB (other than ETWS/CMAS) in SIB1 changes.

Figure 6:
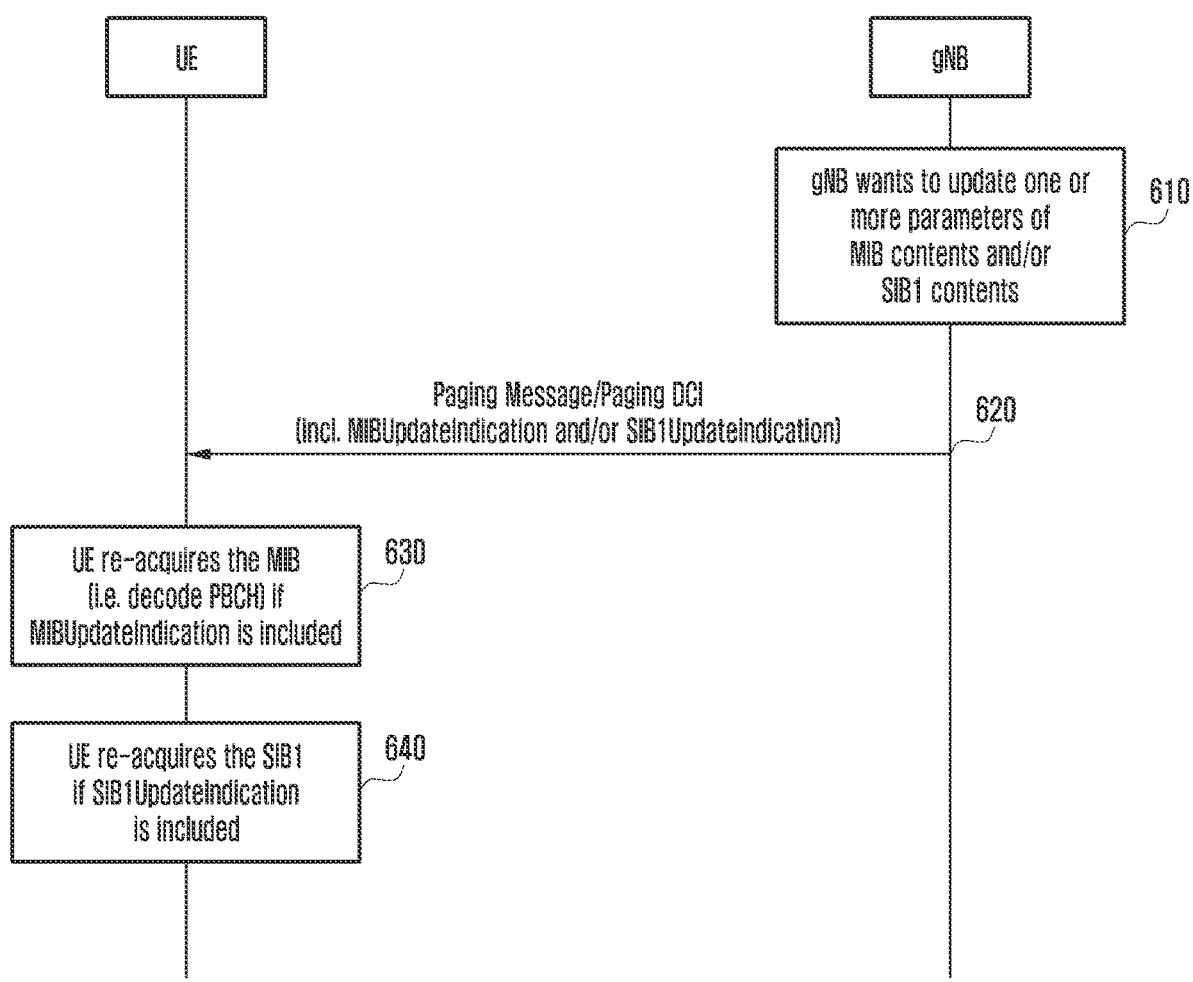
FIG. 6 shows signaling between a UE and a next generation node B (gNB) based on Embodiment 3 according to Method 1 of the disclosure.

FIG. 6 shows signaling between a UE and a gNB based on Embodiment 3 according to Method 1 of the disclosure.

Referring to FIG. 6, the gNB determines whether to update one or more parameters of MIB contents and/or SIB1 contents, at operation 610. If the gNB wants to update one or more parameters of MIB contents and/or SIB1 contents, the gNB transmits paging message or paging DCI, at operation 620. The paging message or paging DCI includes an MIB update indication and/or an SIB1 update indication. If the MIB update indication is included in the paging message or paging DCI, the UE reacquires the MIB (i.e., decodes PBCH), at operation 630. If the SIB1 update indication is included in the paging message or paging DCI, the UE reacquires the SIB1, at operation 640.

It is to be noted that, in a system in which an MIB update notification and an SIB1 update notification are included only in paging DCI, a UE checks for these notifications in paging DCI and not in paging message.

Embodiment 4: MIB Update Indication/PBCH Update Indication+Update Indication for Each SIB In this embodiment, UE reacquires MIB (if updated) and only updated SIB according to indication.

Figure 7:
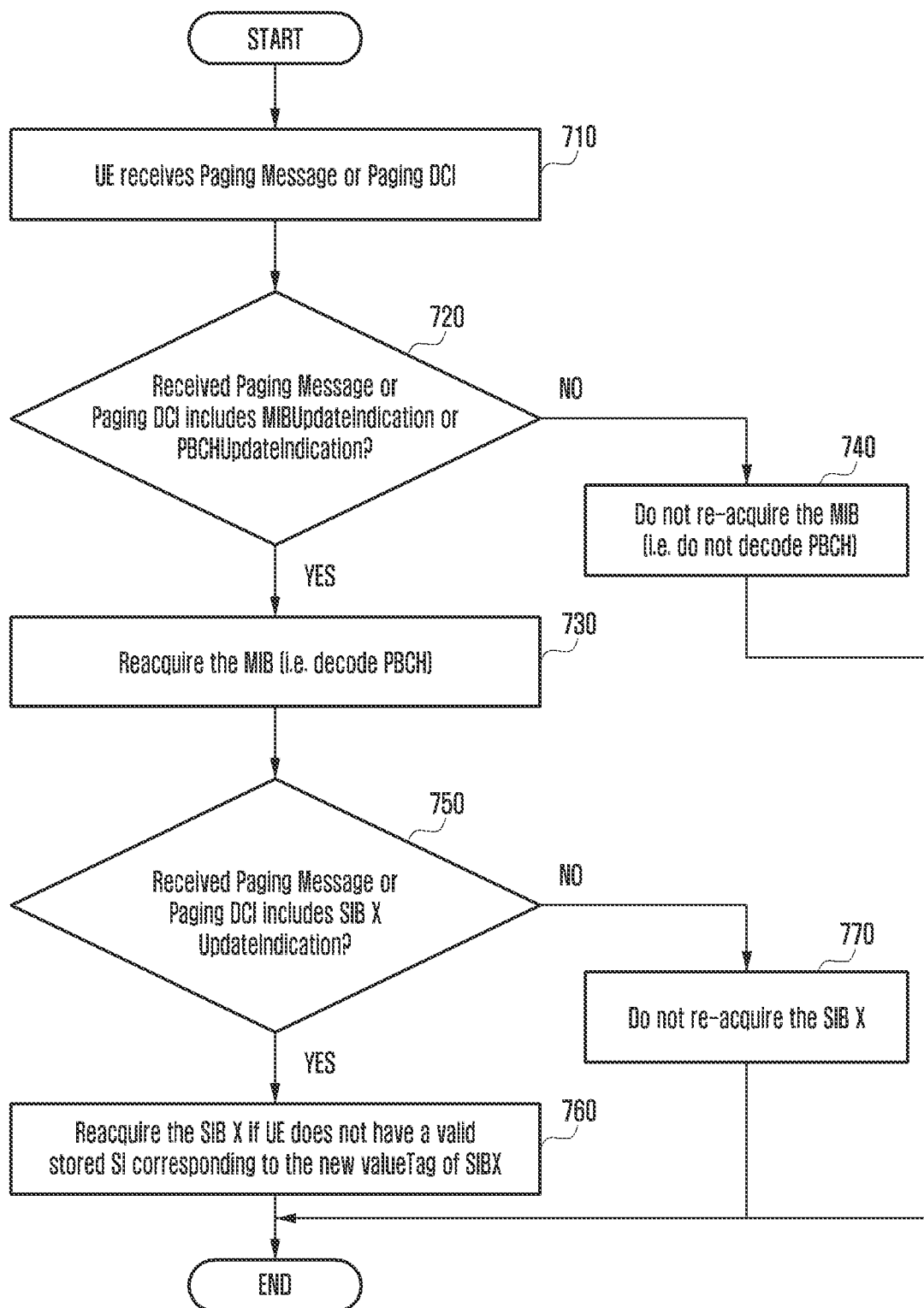
FIG. 7 shows UE operations for a master information block (MIB) and system information (SI) update based on Embodiment 3 according to Method 1 of the disclosure.

FIG. 7 shows UE operations for an MIB and SI update based on Embodiment 3 according to Method 1 of the disclosure. In this embodiment, update indication is there for each individual SIB in paging message/paging DCI. The update indication is also there for MIB in paging message/paging DCI. In this embodiment, update indication can be there for each individual SI message in paging message/paging DCI. Each SI message carries one or more SIBs wherein the mapping between SI messages and SIBs is signaled in SIB 1.

Referring to FIG. 7, upon receiving the paging message or paging DCI, at operation 710, UE checks whether MIB update notification/PBCH Update notification is included in the received paging message or paging DCI or not, at operation 720. If yes, the UE reacquires the MIB (i.e., decodes PBCH), at operation 730. Otherwise, the UE does not reacquire the MIB (i.e., does not decode PBCH), at operation 740.

In an embodiment, the MIB update notification/PBCH update notification can be indicated in paging message or paging DCI by using a P-RNTI reserved for indicating MIB update/PBCH update. In this case MIB update notification bit is not needed in paging message or paging DCI. The PDCCH will be addressed (i.e., CRC is masked) to this reserved P-RNTI if network wants UE to update the MIB. Otherwise, network will use the other P-RNTI. In this embodiment, UE will check whether the received paging message or paging DCI is addressed to P-RNTI reserved for MIB update indication or not. If yes, UE reacquires the MIB. Otherwise UE does not reacquire the MIB.

For each SIB which UE needs to maintain depending on its state and/or service supported by it, UE also checks whether an update notification is included in received paging message or paging DCI or not for that SIB, at operation 750. If yes, UE reacquires that SIB if UE does not have a valid stored SI corresponding to the new valueTag for that SIB, at operation 760. In an embodiment, UE can read the SIB1 in order to determine the new valueTag of that SIB by reading SIB 1. Alternately, UE can obtain the new valueTag of that SIB from the received paging message or paging DCI. In yet another embodiment, the new valuetag corresponding to the updated SIB is included in the SIB itself and UE reacquires the updated SIB contents along with the new valuetag. In this case, since new valuetag of updated SIB is not included in paging message/paging DCI and UE does not reacquire SIB1 for new valuetag, the UE cannot determine if the stored valid SI corresponds to new valuetag of updated SIB. Therefore, the UE needs to reacquire the updated SIB. If the received paging message or paging DCI does not include the update notification (i.e., SIB X UpdateIndication), the UE does not reacquire that SIB (i.e., SIB X), at operation 770.

It is to be noted that, in a system in which update notification(s) are included only in paging DCI, a UE checks for these notifications in paging DCI and not in paging message.

For indicating update indication for each SIB, following design options are proposed.

1) Paging message or paging DCI includes one bit indication for each SIB. Each of these can be set to TRUE (1) or FALSE (0).

2) Paging message or paging DCI includes one bit indication for each SIB. Each of these is optionally included. If included the value of indication is TRUE.

3) Paging message or paging DCI includes a variable size bit string. Each bit in the bit string corresponds to an SIB/SI message. The length of bit string is also included in paging message or paging DCI. The MIB update indication is a separate bit than the variable size bit string.

4) Paging message or paging DCI includes a list of bit strings (each string 8 bits). For example, each bit in bit string 1 in the list corresponds to SIB 1 to SIB 8. Each bit in bit string 2 in the list corresponds to SIB 9 to SIB 16. And so on. The MIB update indication is a separate bit than the list of bit strings.

5) Paging message or paging DCI includes multiple bit strings or bitmaps. Each of these bit strings is optionally included.

SIB bit map 1 (for SIB1-8)
SIB bit map 2 (for SIB9-16)
SIB bit map 3 (for SIB17-24)

Each bit map is optional. The MIB update indication is a separate bit than the list of bitmaps.

Paging message or paging DCI includes a list of one or more SI-indices corresponding to SI messages which are updated. SI message corresponding to first entry in schedulingInfoList has SI-index zero, SI message corresponding to second entry in schedulingInfoList has SI-index one, SI message corresponding to nth entry in schedulingInfoList has SI-index n−1. schedulingInfoList is signaled by gNB in SIB1. For each SIB which UE needs to maintain depending on its state and/or service supported by it, it checks whether the SI-index of SI message to which that SIB is mapped is included in paging message or paging DCI or not. If yes, UE reacquires that SIB if UE does not have a valid stored SI corresponding to the new valueTag for that SIB. In an embodiment, UE can read the SIB1 in order to determine the new valueTag of that SIB by reading SIB 1. Alternately, UE can obtain the new valueTag of that SIB from the received paging message or paging DCI.

In an embodiment, gNB transmits SI update notification in paging message or paging DCI. Here, the gNB transmits this for updating any SI (other than emergency SIBs). In this embodiment, acquisition of MIB upon receiving the SI Update Notification is performed by UE in RRC IDLE/INACTIVE state. UE in RRC CONNECTED receives the updated parameters (such as SCS of initial DL BWP, dmrs-TypeA-Position, pdcch-ConfigSIB1) of MIB in dedicated RRC signaling message from gNB. There is no need for RRC CONNECTED state UEs to decode PBCH to reacquire updated MIB contents or updated L1 encoding upon receiving SI update notification. Upon receiving SI update notification UE in RRC CONNECTED as well as UE in RRC IDLE/INACTIVE reacquires SIB 1. In embodiments where MIBUpdateNotification is transmitted by gNB in paging message or paging DCI, upon receiving MIBUpdateNotification, acquisition of MIB is performed by UE in RRC IDLE/INACTIVE state. RRC CONNECTED UE does not acquire MIB upon receiving MIBUpdateNotification.

MIB Update Considering BWPs

Figure 8:
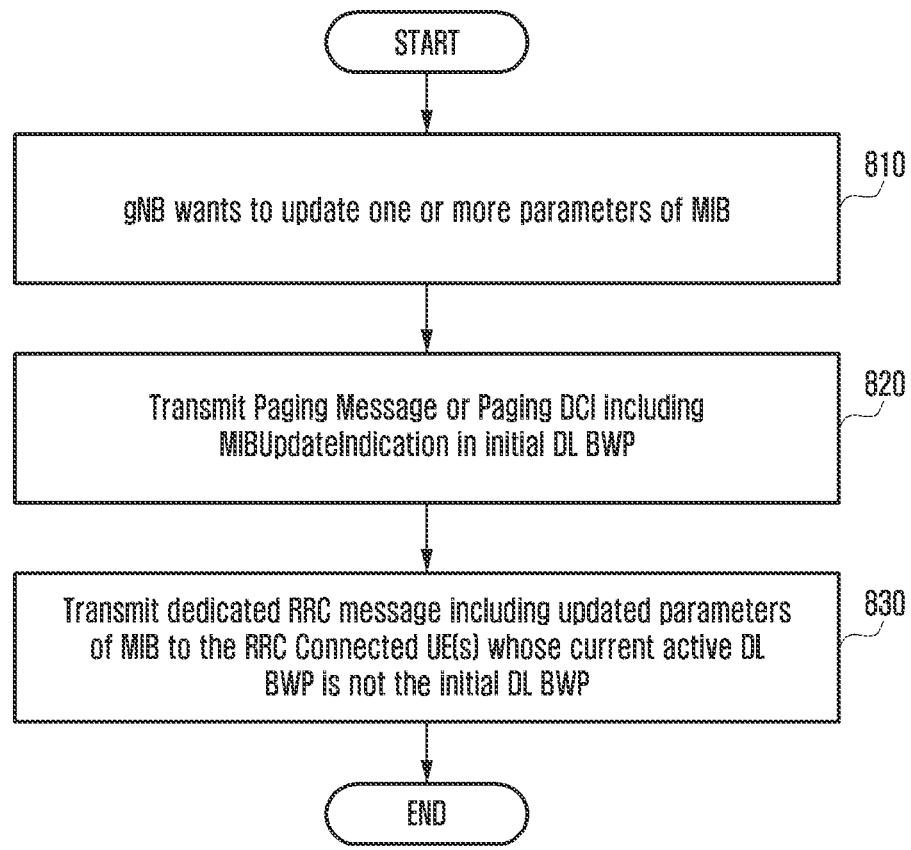
FIG. 8 illustrates next generation node B (gNB) operations in one embodiment according to Method 2 of the disclosure.

Method 2:

FIG. 8 illustrates gNB operations in one embodiment according to Method 2 of the disclosure.

Referring to FIG. 8, if gNB wants to update one or more parameters for MIB, at operation 810, it transmits paging message or paging DCI including MIBUpdateIndication, wherein the paging message is transmitted on initial DL BWP, at operation 820. Further, the gNB also transmits dedicated RRC message including updated parameters of MIB contents and/or updated L1 contents of PBCH transport block to the RRC CONNECTED UE(s) whose current active DL BWP is not the initial DL BWP, at operation 830. In this method, RRC CONNECTED UE(s) whose current active DL BWP is not initial DL BWP, receives the updated parameters (such as SCS of initial DL BWP, dmrs-TypeA-Position, pdcch-ConfigSIB1) of MIB contents and/or updated L1 contents of PBCH which are needed in RRC CONNECTED state in dedicated RRC message (e.g., in RRCReconfigurationMessage). The MIB contents and/or updated L1 contents of PBCH which are needed in RRC CONNECTED state may include subCarrierSpacingCommon, dmrs-TypeA-Position, and pdcch-ConfigSIB1 (i.e., search space zero and control resource set (CORESET) zero).

Figure 9:
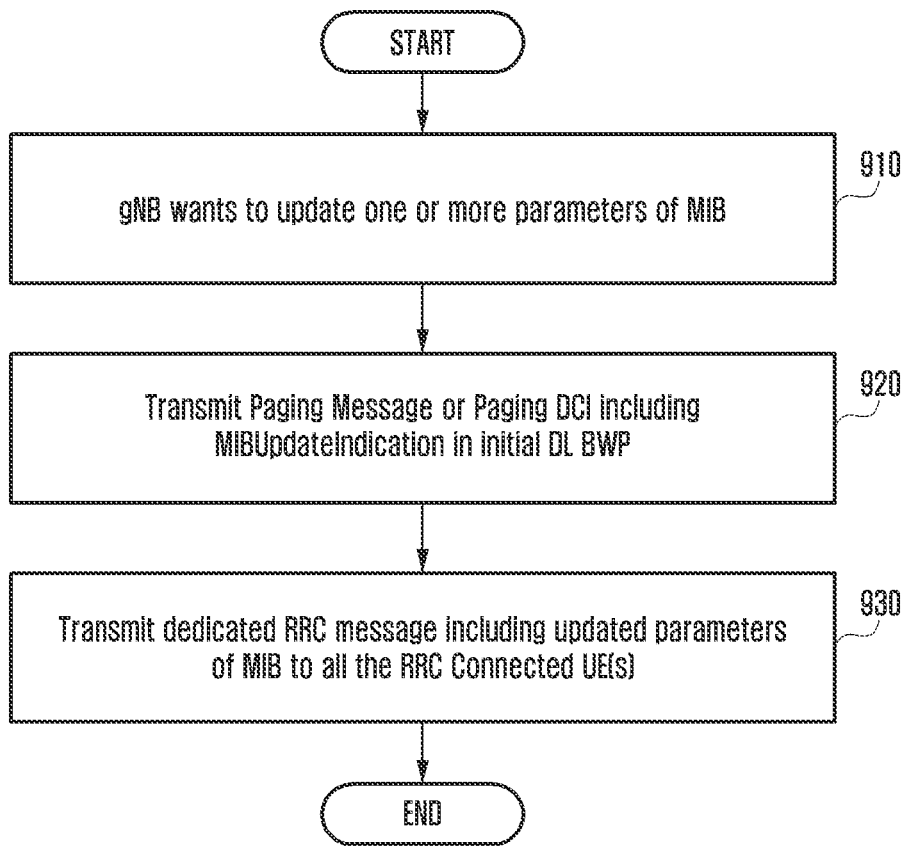
FIG. 9 illustrates next generation node B (gNB) operations in one embodiment according to Method 3 of the disclosure.

Method 3:

FIG. 9 illustrates gNB operations in one embodiment according to Method 3 of the disclosure.

Referring to FIG. 9, if gNB wants to update one or more parameters for MIB contents and/or L1 contents of PBCH, at operation 910, it transmits paging message or paging DCI including MIBUpdateIndication/PBCHUpdateIndication, wherein the paging message is transmitted on initial DL BWP, at operation 920. Further, the gNB also transmits dedicated RRC message (e.g. in RRCReconfigurationMessage) including updated parameters of MIB contents and/or L1 contents of PBCH to all the RRC CONNECTED UE(s), at operation 930. In this method, RRC CONNECTED UE(s) receives the updated parameters of MIB contents and/or updated L1 contents of PBCH in dedicated RRC message. Here, an RRC CONNECTED UE does not need decode PBCH to acquire MIB to receive the updated parameters (such as SCS of initial DL BWP, dmrs-TypeA-Position, pdcch-ConfigSIB1) of MIB (even if it receives paging message indicating MIB update). The MIB contents and/or updated L1 contents of PBCH which are needed in RRC CONNECTED state may include subCarrierSpacingCommon, dmrs-TypeA-Position, and pdcch-ConfigSIB1 (i.e., search space zero and CORESET zero).

Figure 10:
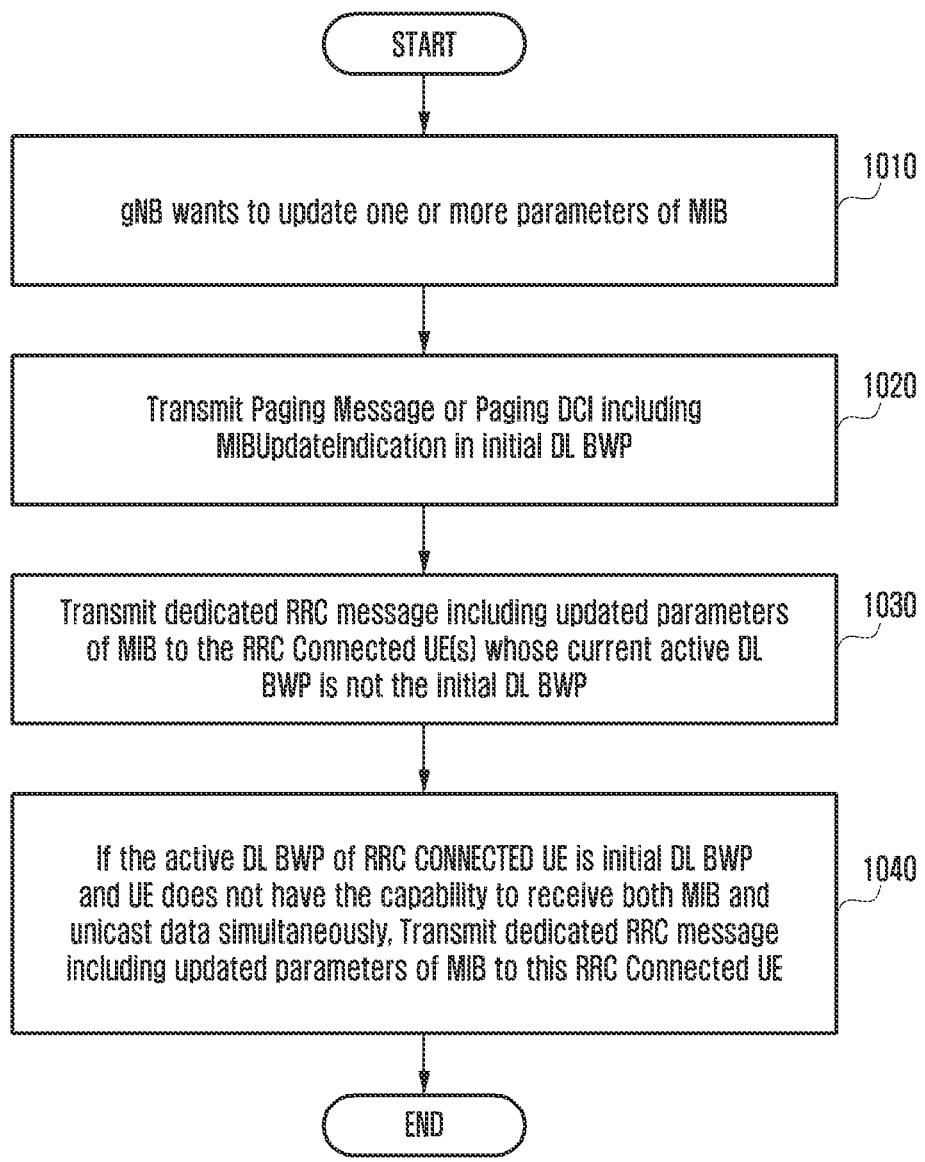
FIG. 10 illustrates next generation node B (gNB) operations in one embodiment according to Method 3 of the disclosure.

Method 4:

FIG. 10 illustrates gNB operations in one embodiment according to Method 3 of the disclosure.

Referring to FIG. 10, if gNB wants to update one or more parameters for MIB contents and/or update L1 contents of PBCH, at operation 1010, it transmits paging message or paging DCI including MIBUpdateIndication/PBCHUpdateIndication, wherein the paging message is transmitted on initial DL BWP, at operation 1020. Further, the gNB also transmits dedicated RRC message (e.g. in RRCReconfigurationMessage) including updated parameters (such as SCS of initial DL BWP, dmrs-TypeA-Position, pdcch-ConfigSIB1) of MIB contents and/or updated L1 contents of PBCH to the RRC CONNECTED UE(s) whose current active DL BWP is not the initial DL BWP, at operation 1030. If the active DL BWP of RRC CONNECTED UE is initial DL BWP and UE does not have the capability to receive both MIB and unicast data simultaneously, the gNB transmits dedicated RRC message (e.g. in RRCReconfigurationMessage) including updated parameters of MIB contents and/or updated L1 contents of PBCH to this RRC Connected UE, at operation 1040. The capability to receive both MIB (i.e., decode PBCH) and unicast data (i.e., decode PDSCH) simultaneously is indicated to gNB by UE in UE capability message. In this method, if the active DL BWP of RRC CONNECTED UE is initial DL BWP and UE does not have the capability to receive both MIB and unicast data simultaneously, the UE will not decode PBCH to read MIB (even if it receives paging message indicating MIB update). It will receive the updated MIB contents and/or updated L1 contents of PBCH in dedicated RRC message from gNB. The MIB contents and/or updated L1 contents of PBCH which are needed in RRC CONNECTED state may include subCarrierSpacingCommon, dmrs-TypeA-Position, and pdcch-ConfigSIB1 (i.e., search space zero and CORESET zero).

Figure 11:
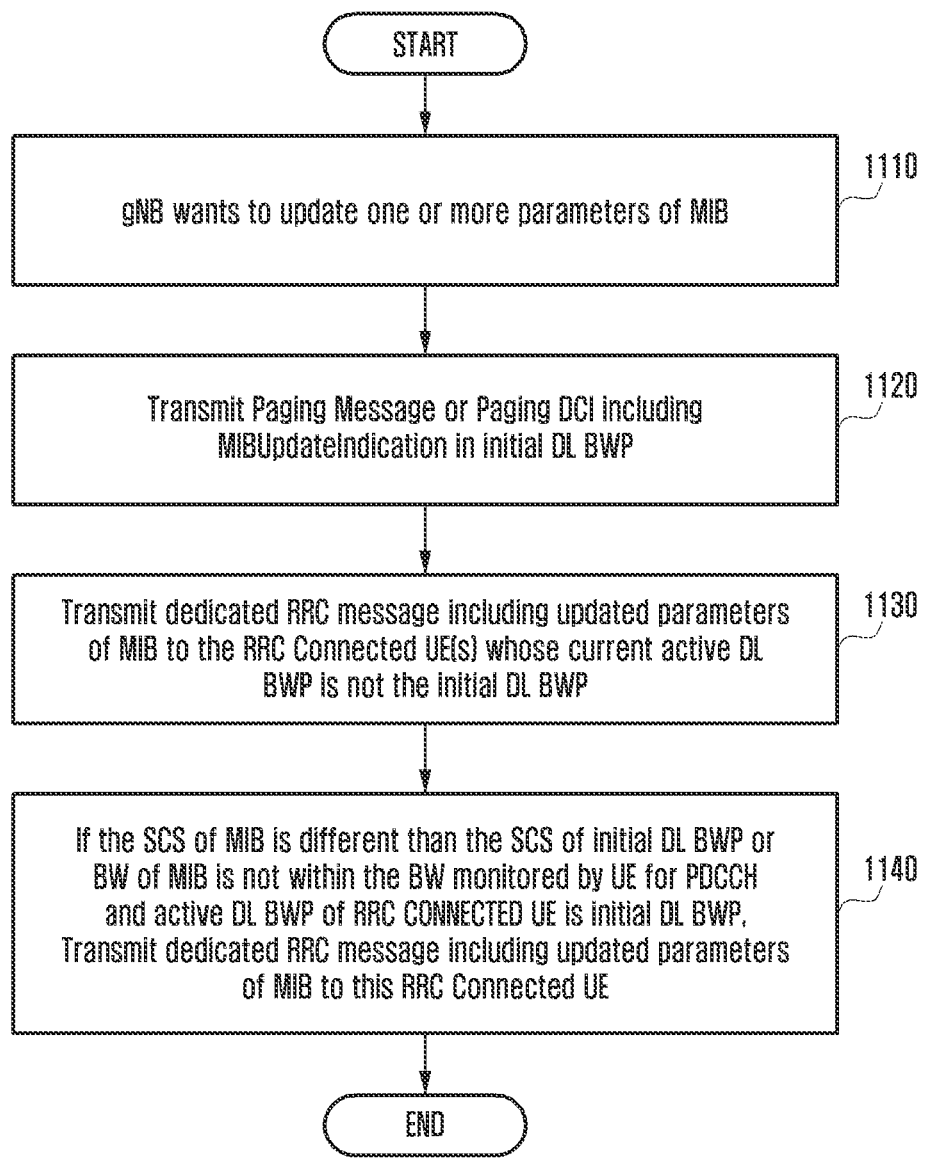
FIG. 11 illustrates next generation node B (gNB) operations in one embodiment according to Method 3 of the disclosure.

Method 5:

FIG. 11 illustrates gNB operations in one embodiment according to Method 3 of the disclosure.

Referring to FIG. 11, if gNB wants to update one or more parameters for MIB contents and/or update L1 contents of PBCH, at operation 1110, it transmits paging message or paging DCI including MIBUpdateIndication/PBCHUpdateIndication, wherein the paging message is transmitted on initial DL BWP, at operation 1120. Further, the gNB also transmits dedicated RRC message (e.g. in RRCReconfigurationMessage) including updated parameters (such as SCS of initial DL BWP, dmrs-TypeA-Position, pdcch-ConfigSIB1) of MIB contents and/or updated L1 contents of PBCH to the RRC CONNECTED UE(s) whose current active DL BWP is not the initial DL BWP, at operation 1130. If the active DL BWP of RRC CONNECTED UE is initial DL BWP and SCS of MIB/PBCH is different than the SCS of initial DL BWP or BWP of MIB/PBCH is not within the BW monitored by UE for PDCCH, the gNB transmits dedicated RRC message (e.g. in RRCReconfigurationMessage) including updated parameters (such as SCS of initial DL BWP, dmrs-TypeA-Position, pdcch-ConfigSIB1) of MIB contents and/or updated L1 contents of PBCH to this RRC Connected UE, at operation 1140. In this method, if the active DL BWP of RRC CONNECTED UE is initial DL BWP and SCS of MIB/PBCH is different than the SCS of initial DL BWP or BWP of MIB/PBCH is not within the BW monitored by UE for PDCCH, the UE will not decode PBCH to read MIB (even if it receives paging message indicating MIB update). It will receive the updated MIB contents and/or updated L1 contents of PBCH in dedicated RRC message from gNB. The MIB contents and/or updated L1 contents of PBCH which are needed in RRC CONNECTED state may include subCarrierSpacingCommon, dmrs-TypeA-Position, and pdcch-ConfigSIB1 (i.e., search space zero and CORESET zero).

Figure 12:
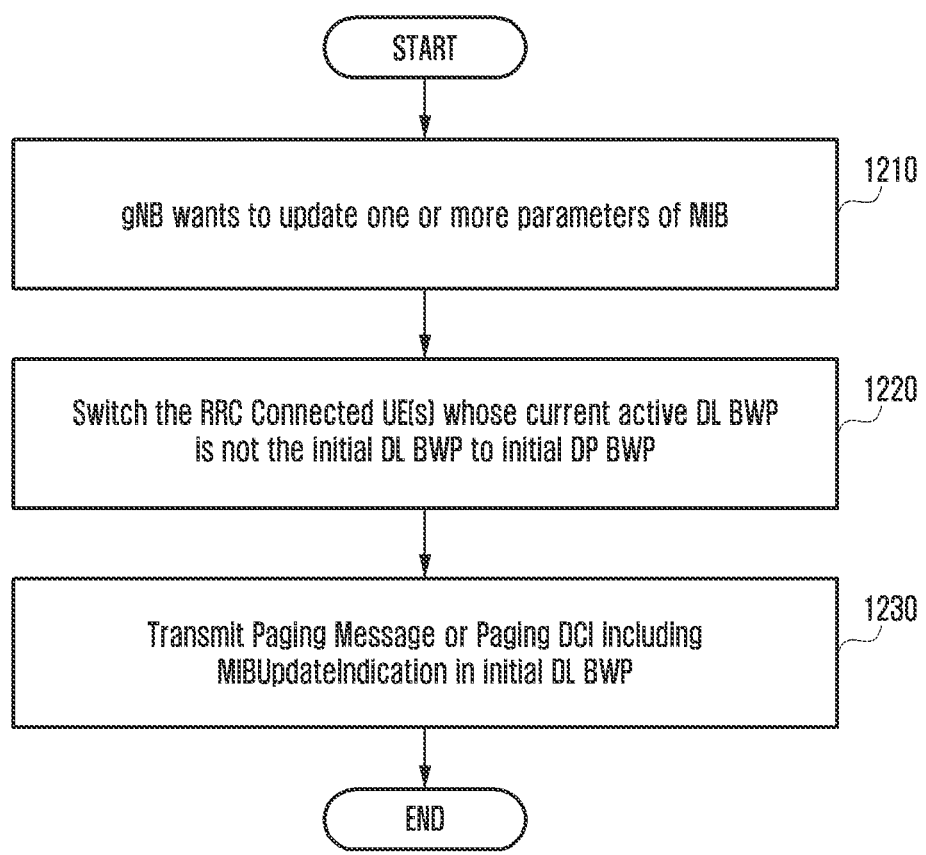
FIG. 12 illustrates next generation node B (gNB) operations in one embodiment according to Method 3 of the disclosure.

Method 6:

FIG. 12 illustrates gNB operations in one embodiment according to Method 3 of the disclosure.

Referring to FIG. 12, if gNB wants to update one or more parameters for MIB contents and/or update L1 contents of PBCH, at operation 1210, gNB switches the RRC Connected UE(s) whose current active DL BWP is not the initial DL BWP to initial DL BWP, at operation 1220. It then transmits paging message or paging DCI including MIBUpdateIndication/PBCHUpdateIndication, wherein the paging message or paging DCI is transmitted on initial DL BWP, at operation 1230.

Figure 13:
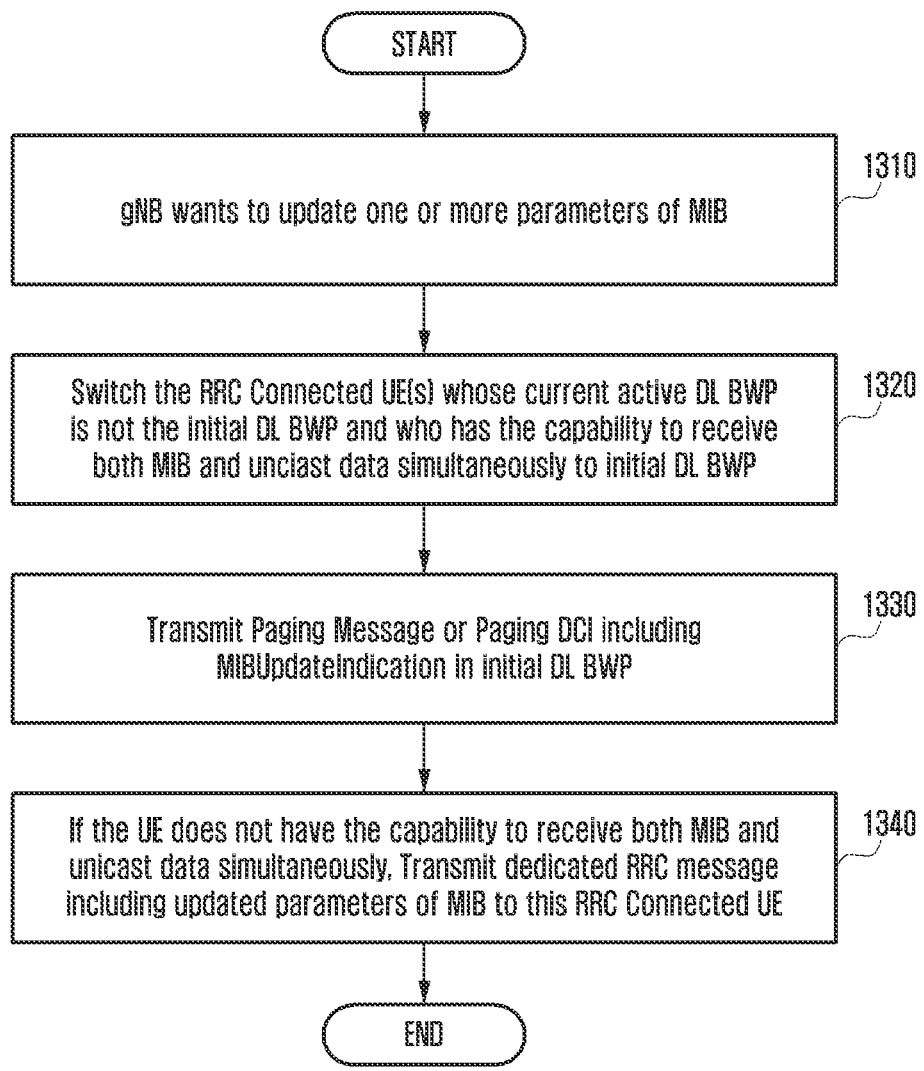
FIG. 13 illustrates next generation node B (gNB) operations in one embodiment according to Method 3 of the disclosure.

Method 7:

FIG. 13 illustrates gNB operations in one embodiment according to Method 3 of the disclosure.

Referring to FIG. 13, if gNB wants to update one or more parameters for MIB contents and/or update L1 contents of PBCH, at operation 1310, gNB switches the RRC Connected UE(s) whose current active DL BWP is not the initial DL BWP and who has the capability to receive both MIB (i.e., decode PBCH) and unicast data (i.e., decode PDSCH) simultaneously to initial DL BWP, at operation 1320. It then transmits paging message or paging DCI including MIBUpdateIndication/PBCHUpdateIndication, wherein the paging message is transmitted on initial DL BWP, at operation 1330. The capability to receive both MIB (i.e., decode PBCH) and unicast data (i.e., decode PDSCH) simultaneously is indicated to gNB by UE in UE capability message. If the UE does not have the capability to receive both MIB and unicast data simultaneously, gNB transmits dedicated RRC message (e.g. in RRCReconfigurationMessage) including updated parameters (such as SCS of initial DL BWP, dmrs-TypeA-Position, pdcch-ConfigSIB1) of MIB contents and/or updated L1 contents of PBCH to this RRC connected UE, at operation 1340. In this method, if the active DL BWP of RRC CONNECTED UE is initial DL BWP and UE does not have the capability to receive both MIB and unicast data simultaneously, the UE will not decode PBCH to read MIB (even if it receives paging message indicating MIB update). It will receive the updated MIB contents and/or updated L1 contents of PBCH in dedicated RRC message (e.g. in RRCReconfigurationMessage) from gNB. The MIB contents and/or updated L1 contents of PBCH which are needed in RRC CONNECTED state may include subCarrierSpacingCommon, dmrs-TypeA-Position, and pdcch-ConfigSIB1 (i.e., search space zero and CORESET zero).

Access Control Enabled/Disabled Indication

The access control parameters are signaled in a separate SIB. Access control is cell-specific and a radio access network (RAN) (i.e., gNB) decides to apply access control to mitigate an RAN overload situation. When the cell is not loaded, there is no reason to apply access control. When load is high, access control is enabled and UE is required to acquire access control SIB in order to apply barring parameters. The issue is how the UE knows whether the access control is enabled or disabled.

Idle/Inactive UEs are required to monitor paging every paging occasion. Therefore, in one method of the disclosure, an access control bit is included in paging message/DCI. Upon receiving the paging message, if the access control bit is set to TRUE (1), UE will enable access control. Otherwise, it will consider the access control as disabled. If the access control bit is set to TRUE (1), to enable access control, i.e., to apply barring parameters, the UE is required to acquire the access control SIB.

Alternately, whether access control is enabled/disabled can be indicated in SIB 1. It could be one access control enabled bit in SIB 1. Alternately, presence/absence of access control parameters in SIB1 can indicate whether access control is enabled/disabled. Alternately, presence/absence of scheduling information of access control SIB or presence/absence of access control SIB in list of SIBs transmitted/supported in SIB1 can indicate whether access control is enabled/disabled. If the access control bit is set to TRUE (1)

in SIB1, to enable access control, i.e., to apply barring parameters, the UE is required to acquire the access control SIB according to the scheduling information of access control SIB. If the access control bit is set to FALSE (0) in SIB1, i.e., access control is disabled, then UE is not required to acquire the access control SIB.

Alternately, if scheduling information of access control SIB is present or access control SIB is present in list of SIBs available in cell, then implicitly UE determines access control is enabled, in order to apply barring parameters the UE is required to acquire the access control SIB according to the scheduling information of access control SIB.

Access control is enabled/disabled can be indicated in MIB. It could be one access control enabled bit in MIB. If the access control bit is set to TRUE (1) in MIB, to enable access control, i.e., to apply barring parameters, the UE is required to acquire SIB 1. The access control SIB is acquired based on the scheduling information of access control SIB in the acquired SIB 1. If the access control bit is set to FALSE (0) in MIB, i.e., access control is disabled, then UE is not required to acquire the access control SIB.

If the access control enabling/disabling bit is included in MIB, and if this bit toggles, then it is considered as MIB content update. In this case, the network will indicate the MIBUpdateIndication/PBCHUpdateIndication through paging message and/or paging DCI. The UE is required to reacquire MIB contents and determine whether to enable/disable access control based on the updated indication in MIB.

If the access control enabling/disabling bit is included in SIB 1, and if this bit toggles, then it is considered as SIB1 content update. In this case the network will indicate the SIB 1UpdateIndication through paging message and/or paging DCI. The UE is required to reacquire SIB1 contents and determine whether to enable/disable access control based on the updated indication in SIB 1.

Further, if the SIB X Update indication in the paging message or paging DCI indicates update of access control SIB, then the UE acquires the updated access control SIB in the current modification period instead of waiting for the next modification period boundary.

In an embodiment, if the access control bit is enabled in MIB or SIB1, UE is not required to send SI request but UE acquires access control SIB from broadcast. If access control bit is enabled and UE does not have stored SI, then UE acquires access control SIB from broadcast and does not trigger SI request.

Paging Occasion (PO) Calculation

In the wireless communication system, the paging is transmitted to page UE(s) which are attached to the wireless communication network but are in RRC idle/inactive mode. In the RRC idle/inactive mode, a UE wake ups at regular intervals (i.e., every paging DRX cycle) for short periods to receive paging, to receive SI update notification, and to receive emergency notifications. Paging message is transmitted using PDSCH. PDCCH is addressed to P-RNTI if there is a paging message in PDSCH. P-RNTI is common for all UEs. UE identity (e.g., system architecture evolution (SAE)-temporary mobile subscriber identity (S-TMSI)) is included in paging message to indicate paging for a specific UE. Paging message may include multiple UE identities to page multiple UEs. Paging message is broadcasted (i.e., PDCCH is masked with P-RNTI) over data channel (i.e., PDSCH). SI update and emergency notifications are included in DCI and PDCCH carrying this DCI is addressed to P-RNTI. In the RRC idle/inactive mode, UE monitors one paging occasion (PO) every DRX cycle. In RRC connected state, UE monitors one or more POs to receive SI update notification and to receive emergency notifications. UE can monitor any PO in paging DRX cycle and monitors at least one PO in SI modification period.

In the legacy system, one PO is a subframe/transmission time interval (TTI) of 1 ms duration. Network may configure several POs in a DRX cycle. UE determines its PO based on UE ID. UE first determines the paging frame (PF) and then determine the PO within the PF. One PF is a radio frame (10 ms), which may contain one or multiple POs. Every radio frame in a DRX cycle can be a paging frame. There can be up to four POs in a PF. The subframes which can be PO in a PF are pre-defined, i.e., subframe #0, subframe #4, subframe #5, and subframe #9. The network signals two parameters. The first parameter is 'T,' i.e., paging DRX cycle duration in number of radio frames. The second parameter is 'nB,' i.e., number of POs in a paging DRX cycle. Here, nB can be configured to one value among 4T, 2T, T, T/2, T/4, T/8, T/16, and T/32. UEs are distributed across several POs in the DRX cycle based on UE ID. Several UEs can be mapped to same PO. The PF for a UE is the radio frame with system frame number 'SFN' which satisfies the equation SFN mod T=(T div N)*(UE_ID mod N); where N equal to min (T, nB) is the number of paging frames in DRX cycle and UE_ID is equal to international mobile subscriber identity (IMSI) mod 1024. Within the determined PF, the PO corresponds to i_s=floor(UE_ID/N) mod Ns; where Ns equal to max (1, nB/T) is the number of paging occasions in a paging frame; i_s can be 0, 1, 2 and 3; mapping between i_s, Ns, and subframe within paging frame is pre-defined.

In the 5G wireless communication system operating in higher frequency (mm Wave) bands, UE and gNB communicates with each other using beamforming Beamforming techniques are used to mitigate the propagation path losses and to increase the propagation distance for communication at higher frequency band. Beamforming enhances the transmission and reception performance using a high-gain antenna. In general, the transmission (TX) beamforming increases directivity by allowing an area in which propagation reaches to be densely located in a specific direction by using a plurality of antennas. The use of the TX beamforming results in the increase in the directivity of a signal, thereby increasing a propagation distance. Further, since the signal is almost not transmitted in a direction other than a directivity direction, a signal interference acting on another receiving end is significantly decreased. By using beamforming technique, a transmitter can make plurality of transmit beam patterns of different directions. Each of these transmit beam patterns can be also referred as TX beam. Wireless communication system operating at high frequency uses plurality of narrow TX beams to transmit signals in the cell as each narrow TX beam provides coverage to a part of cell. The narrower the TX beam, higher is the antenna gain and hence the larger the propagation distance of signal transmitted using beamforming In case of high frequency band, paging needs to be transmitted using beamforming. At higher frequencies, beamforming is essential to compensate for path loss. One TX beam cannot provide the full cell coverage. Paging needs to be transmitted using the multiple TX beams. Since the number of TX beams depends on network deployment, the existing design wherein the duration of PO is one subframe and locations of POs are pre-defined is inefficient and lacks scalability.

In the disclosure a scalable design is provided to determine PO. In the disclosure, POs are determined in such a way that PDCCH monitoring occasions for monitoring paging in PO are overlapping with PDCCH monitoring occasions for RMSI (also known as SIB1). As a result, additional beam sweeping (if there are N TX beams at gNB, gNB transmits using these TX beams in N time intervals wherein each transmission is using a different TX beam) for paging transmission can be avoided.

In a 5G wireless communication system, the synchronization signal and PBCH block (SSB) consists of primary and secondary synchronization signals (PSS, SSS) and PBCH in cell. An SSB burst set (comprising of a set of SSBs) is transmitted periodically where the periodicity is 5 ms, 10 ms, 20 ms, 40 ms, 80 ms, and 160 ms.

Figure 14:
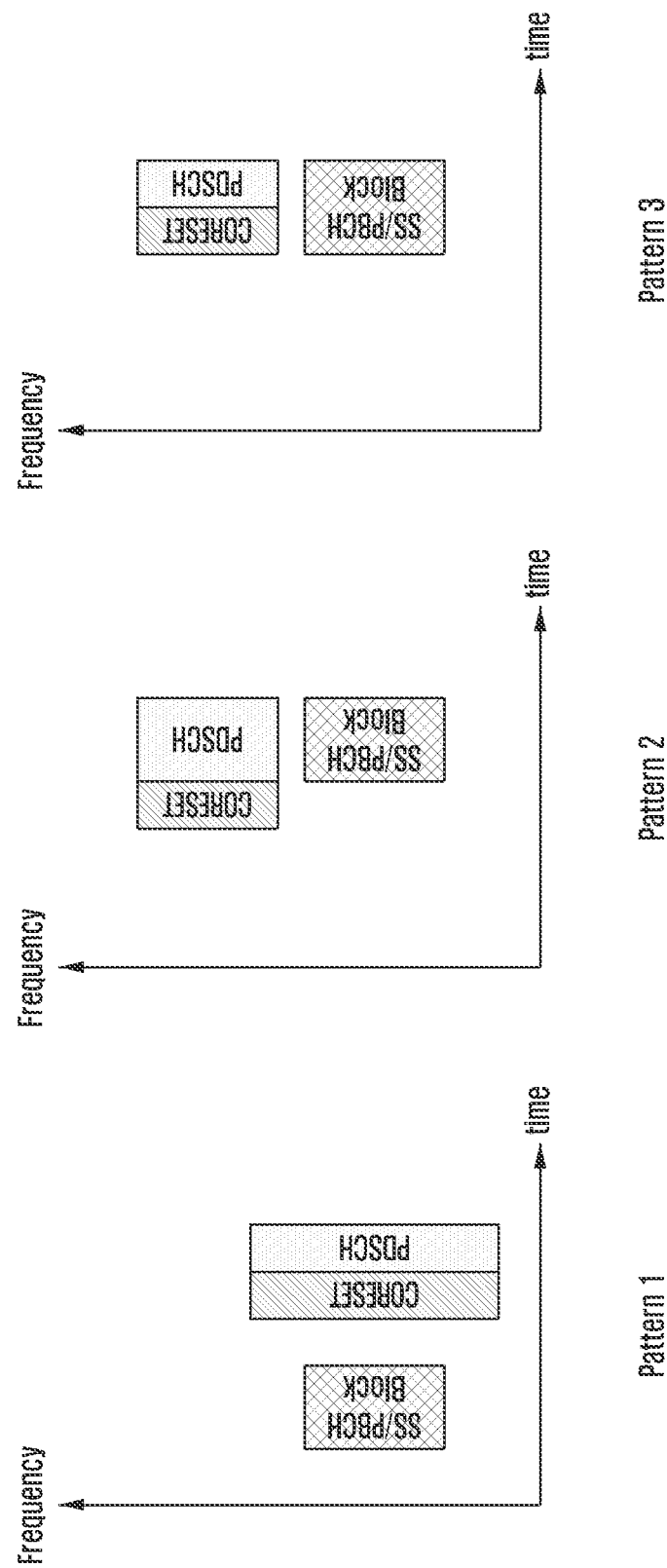
FIG. 14 shows three patterns for transmitting remaining minimum system information (RMSI) in a fifth generation (5G) wireless communication system.

FIG. 14 shows three patterns for transmitting RMSI in a 5G wireless communication system.

Referring to FIG. 14, "Pattern 1" refers to the multiplexing pattern that SS/PBCH block and RMSI CORESET occur in different time instances, and SS/PBCH block TX BW and BW containing RMSI CORESET overlap. "Pattern 2" refers to the multiplexing pattern that SS/PBCH block and RMSI CORESET occur in different time instances, and SS/PBCH block TX BW and the BW containing RMSI CORESET do not overlap. "Pattern 3" refers to the multiplexing pattern that SS/PBCH block and RMSI CORESET occur in the same time instance, and SS/PBCH block TX BW and the BW containing RMSI CORESET do not overlap.

For pattern 1, a set of PDCCH monitoring occasions for RMSI occurs every 20 ms starting from SFN 0. This set comprises PDCCH monitoring occasion for each SSB. In this set, there is one to one mapping between PDCCH monitoring occasion and SSB. The set of PDCCH monitoring occasions can be located within a radio frame which satisfies SFN mod 2=0. The set of PDCCH monitoring occasions can span multiple radio frames (i.e., PDCCH monitoring occasions for some SSBs are in radio frame which satisfies SFN mod 2=0 and PDCCH monitoring occasions for some SSBs are in radio frame which satisfies SFN mod 2=1. For pattern 2 or 3, a set of PDCCH monitoring occasions for RMSI occurs every SS burst set period. The radio frame is same as the radio frame in which SSB is transmitted. The location of each PDCCH monitoring occasion for RMSI is determined as defined in 3GPP TS 38.213.

Reference Radio Frame or Paging Frame for PO Determination

UE first derives the reference frame or paging frame. One paging frame (PF) is one radio frame and may contain one or multiple PO(s) or starting point of a PO. Each radio frame in DRX cycle can be a paging frame. In case the number of paging frames are less than number of radio frames in DRX cycle (i.e., each radio frame in DRX cycle is not a paging frame), the legacy equation used in a 4G system always locates PO in even radio frames. For RMSI pattern 3, the PO should be located in radio frame (odd or even) in which an SS burst set is transmitted. For example, if SS burst set period is 20 ms, network can transmit SS burst set in odd radio frames or in even radio frames. For pattern 1, offset is 0 as PO always starts in radio frame for which SFN mod 2=0. For pattern 2 or 3, offset is equal to smallest SFN in which SSBs are transmitted. Therefore, in the disclosure the legacy equation is enhanced to include an offset. For paging procedures to be agnostic to patterns, offset may be signaled by the network. For example, the offset is signaled in system information. In the disclosure, the PO monitored by UE starts in radio frame which satisfies:

$$(SFN+\text{offset}) \bmod T = (T \text{ div } N) * (UE\_ID \bmod N)$$

Where:
T: DRX cycle of the UE. T is determined by the shortest of the UE specific DRX value, if allocated by upper layers (i.e. NAS), and a default DRX value broadcast in system information. If UE specific DRX is not configured by upper layers, the default value is applied. SFN is the system frame number or radio frame number;
N: number of paging frames in DRX cycle; and
UE_ID: IMSI mod 1024 or S-TMSI mode 1024.

PO Determination

In the disclosure, there can be one (Ns=1) or two (Ns=2) POs per paging frame. In the disclosure, PDCCH monitoring occasions for paging is same as the PDCCH monitoring occasions for RMSI (also known as SIB1). The PDCCH monitoring occasions for RMSI are determined as specified in clause 13 of TS 38.213. PO is the set of PDCCH monitoring occasions for RMSI. This set includes PDCCH monitoring occasions for each SSB. For nB=2T (i.e., Ns=2), there are two POs within a radio frame, one in first half frame of radio frame and another second half frame of radio frame. The UE monitors the PDCCH monitoring occasions for paging in the PO pointed to by index i_s, where i_s is derived from the following equation:

$$i\_s = \text{floor}(UE\_ID/N) \bmod Ns.$$

Where:
Ns=number of paging occasions per paging frame.

TABLE

| Ns | PO when i_s = 0 | PO when i_s = 1 |
|---|---|---|
| 1 | PO is the set of PDCCH monitoring occasions for RMSI, where the first PDCCH monitoring occasion for RMSI starts in determined reference radio frame. | N/A |
| 2 | PO is the set of PDCCH monitoring occasions for RMSI in 1$^{st}$ half frame of determined reference radio frame. | PO is the set of PDCCH monitoring occasions for RMSI in 2nd half frame of determined reference radio frame. |

For Ns=1 and i_s=0, PO is the set of PDCCH monitoring occasions for RMSI, wherein the PO starts from the first PDCCH monitoring occasion or RMSI in determined reference frame (or paging frame).

For Ns=2 and i_s=0, PO is the set of PDCCH monitoring occasions for RMSI in 1$^{st}$ half frame of determined reference frame (or paging frame); Note that each radio frame has two half frames.

For Ns=2 and i_s=1, PO is the set of PDCCH monitoring occasions for RMSI in 2nd half frame of determined reference frame (or paging frame); Note that each radio frame has two half frames.

Multiple BWPs for Paging

In the existing system, all UEs camped to a cell monitors paging in the initial DL BWP. The initial DL BWP is signaling in RMSI (or SIB1). In order to enhance the paging capacity, RMSI (or SIB1) can broadcast a list of DL BWPs for paging. Each of these DL BWPs is associated with a BWP ID. UE selects one of these DL BWPs for monitoring paging. The selection can be done based on UE ID. A UE may monitor paging in DL BWP with BWP ID 'X' where UE ID mod 'number of DL BWPs'=X.

Figure 15:
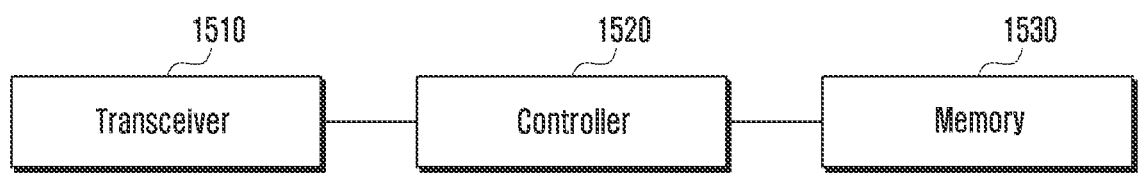
FIG. 15 is a block diagram of a terminal according to an embodiment of the disclosure.

FIG. 15 is a block diagram of a terminal according to an embodiment of the disclosure.

Referring to FIG. 15, a terminal includes a transceiver 1510, a controller 1520, and a memory 1530. The controller 1520 may refer to a circuitry, an ASIC, or at least one processor. The transceiver 1510, the controller 1520, and the memory 1530 are configured to perform the operations of the UE illustrated in the drawings, e.g., FIGS. 1 to 7, or described above. Although the transceiver 1510, the controller 1520, and the memory 1530 are shown as separate entities, they may be realized as a single entity like a single chip. Alternatively, the transceiver 1510, the controller 1520, and the memory 1530 may be electrically connected to or coupled with each other.

The transceiver 1510 may transmit and receive signals to and from other network entities, e.g., a base station.

The controller 1520 may control the UE to perform functions according to one of the embodiments described above.

For example, the controller 1520 is configured to determine a PF based on an offset used for PF determination 'PF_offset,' the DRX cycle of the terminal 'T,' the number of total PFs in the DRX cycle 'N,' and an identifier of the terminal 'UE_ID.' The values of N and PF_offset are derived from the parameter in system information. The controller 1520 is configured to determine index 'i_s' indicating the index of PO in the PF based on the identifier of the terminal 'UE_ID,' the number of PFs in the DRX cycle 'N,' and the number of POs for the PF 'Ns.' The controller 1520 is configured to determine a PO based on the number of POs for the PF 'Ns,' and the index of the PO in the PF 'i_s.' A PO is a set of PDCCH monitoring occasions and can consist of multiple time slots (e.g. subframe or OFDM symbol) where paging DCI can be sent. One PF is one radio frame and may contain one or multiple PO(s) or starting point of a PO. The PDCCH monitoring occasions for paging are same as for RMSI. Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF. The controller 1520 is configured to monitor the PO to receive a paging message.

In another example, the controller 1520 is configured to control the transceiver 1510 to receive an indication about change of system information, and acquire a SIB1 based on a state of the terminal. Upon receiving the SI update notification, the terminal in RRC IDLE/INACTIVE may reacquire MIB whereas the RRC CONNECTED terminal may not reacquire MIB. In other words, the controller 1520 is configured to acquire a MIB if the terminal is in an RRC IDLE or INACTIVE state, whereas the controller 1520 is configured to skip acquisition of a MIB if the terminal is in an RRC_CONNECTED state. The indication may be received in a paging message or DCI to indicate the change of the system information.

In an embodiment, the operations of the terminal may be implemented using the memory 1530 storing corresponding program codes. Specifically, the terminal may be equipped with the memory 1530 to store program codes implementing desired operations. To perform the desired operations, the controller 1520 may read and execute the program codes stored in the memory 1530 by using a processor or a central processing unit (CPU).

Figure 16:
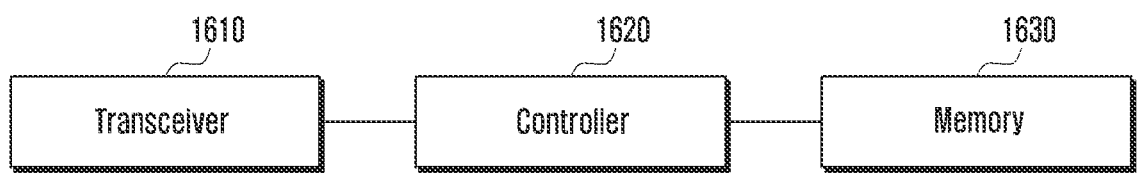
FIG. 16 is a block diagram of a base station (BS) according to an embodiment of the disclosure.

FIG. 16 is a block diagram of a base station according to an embodiment of the disclosure.

Referring to FIG. 16, a base station (BS) includes a transceiver 1610, a controller 1620, and a memory 1630. The transceiver 1610, the controller 1620, and the memory 1630 are configured to perform the operations of the network (e.g., gNB) illustrated in the drawings, e.g., FIGS. 8 to 13, or described above. Although the transceiver 1610, the controller 1620, and the memory 1630 are shown as separate entities, they may be realized as a single entity like a single chip. The transceiver 1610, the controller 1620, and the memory 1630 may be electrically connected to or coupled with each other.

The transceiver 1610 may transmit and receive signals to and from other network entities, e.g., a terminal. The controller 1620 may control the BS to perform functions according to one of the embodiments described above. The controller 1620 may refer to a circuitry, an ASIC, or at least one processor. In an embodiment, the operations of the BS may be implemented using the memory 1630 storing corresponding program codes. Specifically, the BS may be equipped with the memory 1630 to store program codes implementing desired operations. To perform the desired operations, the controller 1620 may read and execute the program codes stored in the memory 1630 by using a processor or a CPU.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
    monitoring an indication on change of system information;
    identifying whether the indication on change of system information is received based on the monitoring;
    identifying radio resource control (RRC) states of the terminal;
    in case that the terminal is in an RRC idle state or an RRC inactive state, acquiring a system information block 1 (SIB1) after acquiring of a master information block (MIB); and
    in case that the terminal is in an RRC connected state and the indication is received, acquiring the SIB1.

2. The method of claim 1, wherein the indication is received in a paging message.

3. The method of claim 1, wherein the indication is received in downlink control information to indicate the change of the system information.

4. A terminal in a wireless communication system, the terminal comprising:
    a transceiver; and
    a controller coupled with the transceiver and configured to:
        monitor an indication on change of system information,
        identify whether the indication on change of system information is received based on the monitoring,
        identify radio resource control (RRC) states of the terminal,
        in case that the terminal is in an RRC idle state or an RRC inactive state, acquire a system information block 1 (SIB1) after acquiring of a master information block (MIB), and
        in case that the terminal is in an RRC connected state and the indication is received, acquire the SIB1.

5. The terminal of claim 4, wherein the controller is configured to:
    receive the indication in a paging message.

6. The terminal of claim 4, wherein the controller is configured to:
    receive the indication in downlink control information to indicate the change of the system information.

7. A method performed by a base station in a wireless communication system, the method comprising:

identifying whether to transmit, to a terminal, an indication about change of system information;

identifying radio resource control (RRC) states of the terminal;

in case that the terminal is in an RRC idle state or an RRC inactive state, transmitting, to the terminal, a system information block 1 (SIB1) after transmitting of a master information block (MIB); and in case that the terminal is in an RRC connected state and the indication is transmitted to the terminal, transmitting, to the terminal, the SIB1.

8. The method of claim 7, wherein the indication is transmitted in a paging message.

9. The method of claim 7, wherein the indication is transmitted in downlink control information to indicate the change of the system information.

10. A base station in a wireless communication system, the base station comprising:

a transceiver; and a controller coupled with the transceiver and configured to:

identify whether to transmit, to a terminal, an indication about change of system information, identify radio resource control (RRC) states of the terminal, in case that the terminal is in an RRC idle state or an RRC inactive state, transmit, to the terminal, a system information block 1 (SIB1) after transmitting of a master information block (MIB), and in case that the terminal is in an RRC connected state and the indication is transmitted to the terminal, transmit, to the terminal, the SIB1.

11. The base station of claim 10, wherein the controller is configured to:

transmit the indication in a paging message.

12. The base station of claim 10, wherein the controller is configured to:

transmit the indication in downlink control information to indicate the change of the system information.

\* \* \* \* \*